US011815989B2

(12) United States Patent
Harutyunyan et al.

(10) Patent No.: US 11,815,989 B2
(45) Date of Patent: Nov. 14, 2023

(54) AUTOMATED METHODS AND SYSTEMS FOR IDENTIFYING PROBLEMS IN DATA CENTER OBJECTS

(71) Applicant: VMware, Inc., Palo Alto, CA (US)

(72) Inventors: Ashot Nshan Harutyunyan, Yerevan (AM); Amak Poghosyan, Yerevan (AM); Naira Movses Grigoryan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/580,143

(22) Filed: Jan. 20, 2022

(65) Prior Publication Data
US 2023/0229548 A1 Jul. 20, 2023

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01); *G06F 11/0754* (2013.01)

(58) Field of Classification Search
CPC ............... G06F 11/0754; G06F 11/079; G06F 11/3452; G06F 11/3447; G06F 17/10; G06F 17/18
See application file for complete search history.

(56) References Cited

U.S. PATENT DOCUMENTS

| | | | | |
|---|---|---|---|---|
| 10,565,046 | B2* | 2/2020 | Tran Van | G06F 11/3452 |
| 11,269,750 | B2* | 3/2022 | Boyapalle | G06F 11/3452 |
| 2008/0097637 | A1* | 4/2008 | Nguyen | G05B 23/0254 |
| | | | | 700/110 |
| 2015/0032752 | A1* | 1/2015 | Greifeneder | H04L 41/064 |
| | | | | 707/738 |
| 2016/0162346 | A1* | 6/2016 | Kushnir | G06F 11/079 |
| | | | | 714/37 |
| 2017/0192872 | A1* | 7/2017 | Awad | G06F 18/2433 |
| 2019/0163550 | A1* | 5/2019 | Harutyunyan | G06F 11/3006 |

OTHER PUBLICATIONS

Harutyunyan, Ashot N. et al., On Machine Learning Approaches for Log Management, 2019, Journal of Universal Computer Science (Year: 2019).*

(Continued)

*Primary Examiner* — Marc Duncan

(57) ABSTRACT

Automated methods and systems for identifying problems associated with objects of a data center are described. Automated methods and systems are performed by an operations management server. For each object, the server determines a baseline distribution from historical events that are associated with a normal operational state of an object. The server determines a runtime distribution of runtime events that are associated with the object and detected in a runtime window of the object. The management server monitors runtime performance of the object while the object is running in the datacenter. When a performance problem is detected, the management server determines a root cause of a performance problem based on the baseline distribution and the runtime distribution and displays an alert in a graphical user interface of a display.

24 Claims, 23 Drawing Sheets

(56) References Cited

OTHER PUBLICATIONS

Fang, Xinghua et al., Statistical Process Control for Unimodal Distribution Based on Maximum Entropy Distribution Approximation, 2017, Entropy (Year: 2017).*
Xintao, Xia et al., Estimation on Reliability Models of Bearing Failure Data, 2018, Hindawi (Year: 2018).*
Veasey, Thomas J. et al., Anomaly Detection in Application Performance Monitoring Data, 2013, IJMLC (Year: 2013).*
Bugajski, Joseph et al., An Event Based Framework for Improving Information Quality That Integrates Baseline Models, Causal Models and Formal Reference Models, 2005, IQIS (Year: 2005).*
Thudumu, Srikanth et al., A comprehensive survey of anomaly detection techniques for high dimensional big data, 2020, Springer (Year: 2020).*
Viswanathan, Krishnamurthy et al., Ranking Anomalies in Data Centers, 2012, IEEE (Year: 2012).*
Wang, Tao et al., Workflow-Aware Automatic Fault Diagnosis for Microservice-Based Applications with Statistics, 2020, IEEE (Year: 2020).*

* cited by examiner log.write([$Time_date] [Thread-$X/$IP/INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
[$Time_date] Repair session $RS for range $range finished)

FIG. 6

[2019-03-10 23:43:36.859+0000] [Thread-1822496/127.0.0.1 INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
[2015-03-10 23:43:36,716] Repair session 51312720-c77e-11e4-ad72-4769d614a3f2 for range
(-6899937477723537626, -6896547230076663429) finished]

FIG. 7

| 1402 | 1404 | 1406 | 1408 |
|---|---|---|---|
| $p$ of success | $N$ | Minimum $L$ | $P(X \geq L) > 0.9995$ |
| 0.99 | 10 | 8 | 0.9998 |
| 0.95 | 10 | 6 | 0.9999 |
| 0.90 | 10 | 5 | 0.9998 |
| 0.85 | 10 | 4 | 0.9998 |
| 0.60 | 10 | 1 | 0.9998 |

| Events 1802 | Performance problem 1804 | Recommendation 1806 |
|---|---|---|
| $\{E_1\}$ | Insufficient CPU allocated | Increase CPU allocation to app |
| $\{E_2\}$ | Insufficient memory allocated | Increase memory allocation to app |
| ⋮ 1808 | ⋮ 1810 | ⋮ 1812 |
| $\{E_1,E_2\}$ | Insufficient vCPU allocated | Increase vCPU allocation to VM |
| $\{E_2,E_4\}$ | Insufficient vmemory allocated | Increase vmemory allocation to VM |
| ⋮ | ⋮ | ⋮ |
| $\{E_8,E_{10},E_{22}\}$ | Insufficient network throughput | Migrate application to another host |
| $\{E_9,E_{12},E_{21}\}$ | Insufficient network throughput | Increase number of vNICs |
| ⋮ | ⋮ | ⋮ |
| $\{E_{27},E_{35},E_{36},E_{46}\}$ | Error in service pack for the application | Backout service pack correction |
| ⋮ | ⋮ | ⋮ |

FIG. 18

AUTOMATED METHODS AND SYSTEMS FOR IDENTIFYING PROBLEMS IN DATA CENTER OBJECTS

TECHNICAL FIELD

This disclosure is directed to detection of problems in a data center.

BACKGROUND

Electronic computing has evolved from primitive, vacuum-tube-based computer systems, initially developed during the 1940s, to modern electronic computing systems in which large numbers of multi-processor computer systems are networked together with large-capacity data-storage devices and other electronic devices to produce geographically distributed data centers that provide enormous computational bandwidths and data-storage capacities. Data centers are made possible by advances in virtualization, computer networking, distributed operating systems, data-storage appliances, computer hardware, and software technologies. In recent years, an increasing number of businesses, governments, and other organizations rent data processing services and data storage space as data center tenants. Data center tenants conduct business and provide cloud services over the internet on software platforms that are maintained and run entirely in data centers, which reduces the cost of maintaining their own centralized computing networks and hosts.

Because data centers have an enormous number of computational resources and execute thousands of computer programs, various management tools have been developed to collect performance information, such as metrics and log messages, to aid systems administrators and data center tenants with detection of hardware and software performance problems. The metrics include CPU usage, memory usage, response time, and network metrics for tens of thousands of virtual and physical objects running in a datacenter. Log messages are unstructured or semi-structured time-stamped messages that record information about the state of an operating system, state of a program, state of a service, or state of computer hardware at a point in time. Typical management tools can generate an alert when a metric violates a threshold or when certain log messages that describe a problem are detected, thereby making systems administrators and data center tenants aware of a problem. However, typical management tools are not able to timely troubleshoot root causes of many types of problems from the information collected. For example, a management tool may generate an alert that identifies a problem with a program running in the datacenter, but the root cause of the problem might actually be the result of a different problem occurring with hardware and/or software located elsewhere in the data center and is not identified in the alert.

Because typical management tools cannot identify the root cause of most problems occurring in a data center, the search for root causes of problems is performed by teams of engineers, such as a field engineering team, an escalation engineering team, and a research and development engineering team. Each team searches for a root cause of a problem by manually filtering metrics and log messages through different sub-teams. However, because of the enormous numbers of metrics and log messages, the troubleshooting process is error prone and can take days and weeks, and in some cases months. Data center tenants cannot afford long periods of time spent sifting through metrics and log files for a root cause of a problem. Employing teams of engineers to spend days and weeks to search for a problem is expensive. Problems with a data center tenant's applications result in downtime or slow performance of their applications, which frustrates users, damages a brand name, causes lost revenue, and in many cases can deny people access to services provided by data center tenants. Systems administrators and data center tenants seek automated methods and systems that can accurately identify root causes of problems with objects in a data center within seconds and minutes and significantly reduce reliance on teams of engineers to search for problems.

SUMMARY

This disclosure is directed to automated methods and systems for identifying performance problems with objects of a data center. An object can be a server computer, a network device, a virtual machine, a container, or an application running in the data center. Automated methods and systems are performed by an operations management server that runs on a server computer of the data center. The management server determines a baseline distribution from historical events that are associated with a normal operational state of the object. The management server determines a runtime distribution of runtime events that are associated with the object and detected in a runtime window of the object. The management server monitors runtime performance of the object while the object is running in the datacenter. When a performance problem is detected, the management server determines a root cause of a performance problem based on the baseline distribution and the runtime distribution. The management server displays an alert in a graphical user interface ("GUI") of a display. The alert identifies the root cause of the performance problem.

DESCRIPTION OF THE DRAWINGS

FIG. 6 shows an example of a log write instruction.

FIG. 7 shows an example of a log message generated by the log write instruction in FIG. 6.

FIG. 18 shows a table of example rules stored used to report performance problems and generate recommendations for correcting the performance problems.

DETAILED DESCRIPTION

Figure 1:
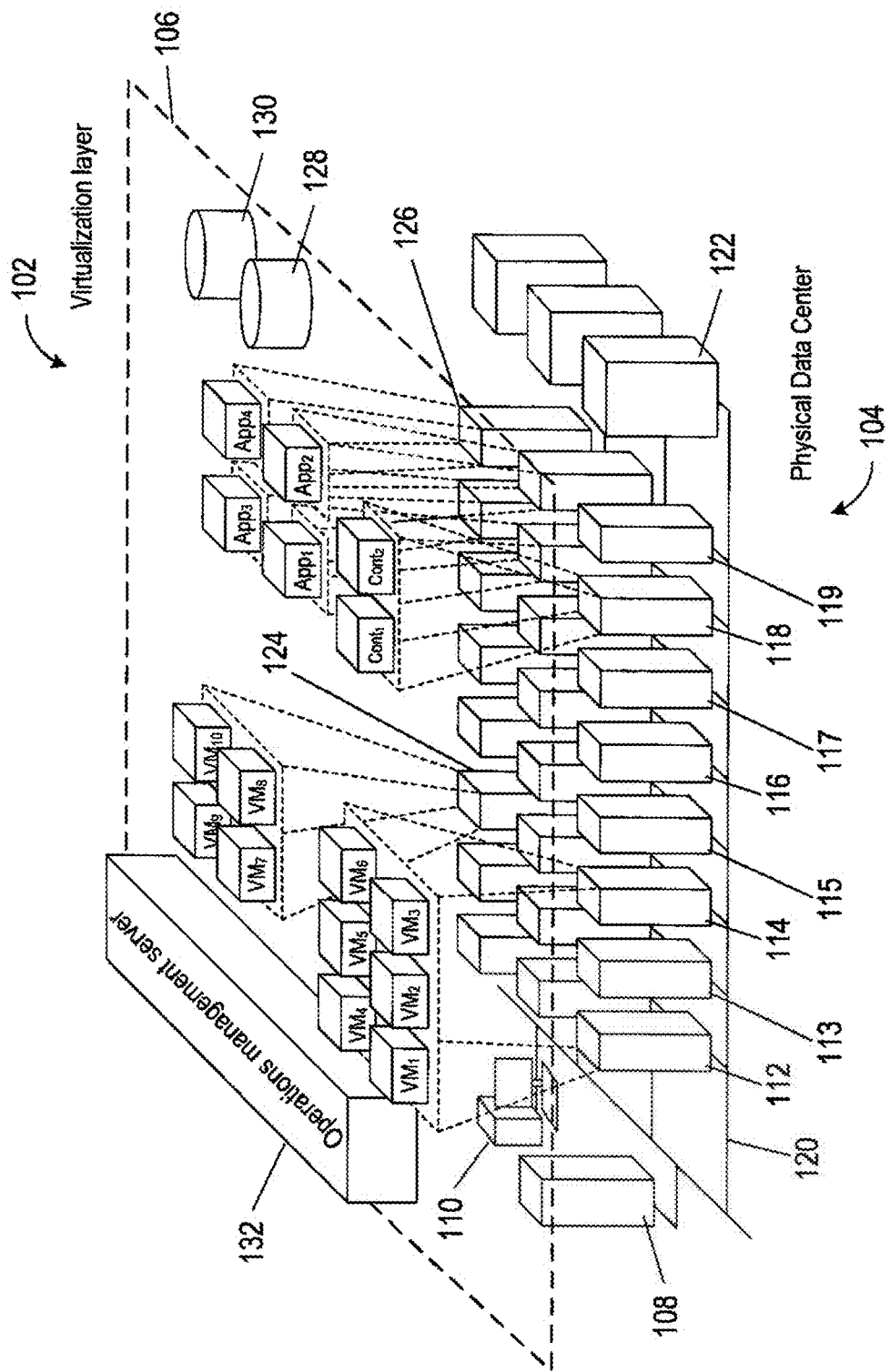
FIG. 1 shows an example of a virtualization layer located above a physical data center.

FIG. 1 shows an example of a virtualization layer 102 located above a physical data center 104. For the sake of illustration, the virtualization layer 102 is separated from the physical data center 104 by a virtual-interface plane 106. The physical data center 104 is an example of a distributed computing system. The physical data center 104 comprises physical objects, including an administration computer system 108, any of various computers, such as PC 110, on which operations management interface may be displayed in a graphical user interface ("GUI") on a display or monitor to system administrators and other users, server computers, such as server computers 112-119, data-storage devices, and network devices. The server computers may be networked together to form server-computer groups within the data center 104. The example physical data center 104 includes three server-computer groups each of which have eight server computers. For example, server-computer group 120 comprises interconnected server computers 112-119 that are connected to a mass-storage array 122. Within each server-computer group, certain server computers are grouped together to form a cluster that provides an aggregate set of resources (i.e., resource pool) to objects in the virtualization layer 102. Different physical data centers may include many different types of computers, networks, data-storage systems, and devices connected according to many different types of connection topologies.

The virtualization layer 102 includes virtual objects, such as VMs, applications, and containers, hosted by the server computers in the physical data center 104. The virtualization layer 102 may also include a virtual network (not illustrated) of virtual switches, routers, load balancers formed from the physical switches, routers, and NICs of the physical data center 104. Certain server computers host VMs and containers as described above. For example, server computer 118 hosts two containers identified as $Cont_1$ and $Cont_2$; cluster of server computers 112-114 host six VMs identified as $VM_1$, $VM_2$, $VM_3$, $VM_4$, $VM_5$, and $VM_6$; server computer 124 hosts four VMs identified as $VM_7$, $VM_8$, $VM_9$, $VM_{10}$. Other server computers may host applications as described above with reference to FIG. 4. For example, server computer 126 hosts an application identified as $App_4$.

The virtual-interface plane 106 abstracts the resources of the physical data center 104 to one or more VDCs comprising the virtual objects and one or more virtual data stores, such as virtual data stores 128 and 130. For example, one VDC may comprise the VMs running on server computer 124 and virtual data store 128. Automated methods and systems described herein are executed by an operations management server 132 in one or more VMs on the administration computer system 108. The operations management server 132 provides several interfaces, such as graphical user interfaces, for data center management, system administrators, and application owners. The operations management server 132 receives streams of metric data, log messages, traces and other object information from various physical and virtual objects of the data center described below.

The operations management server 132 receives object information regarding each object of the data center. The object information includes metrics, log messages, application traces, and RED ("rate requests, errors, and duration") metrics for the traces.

Figure 2A:
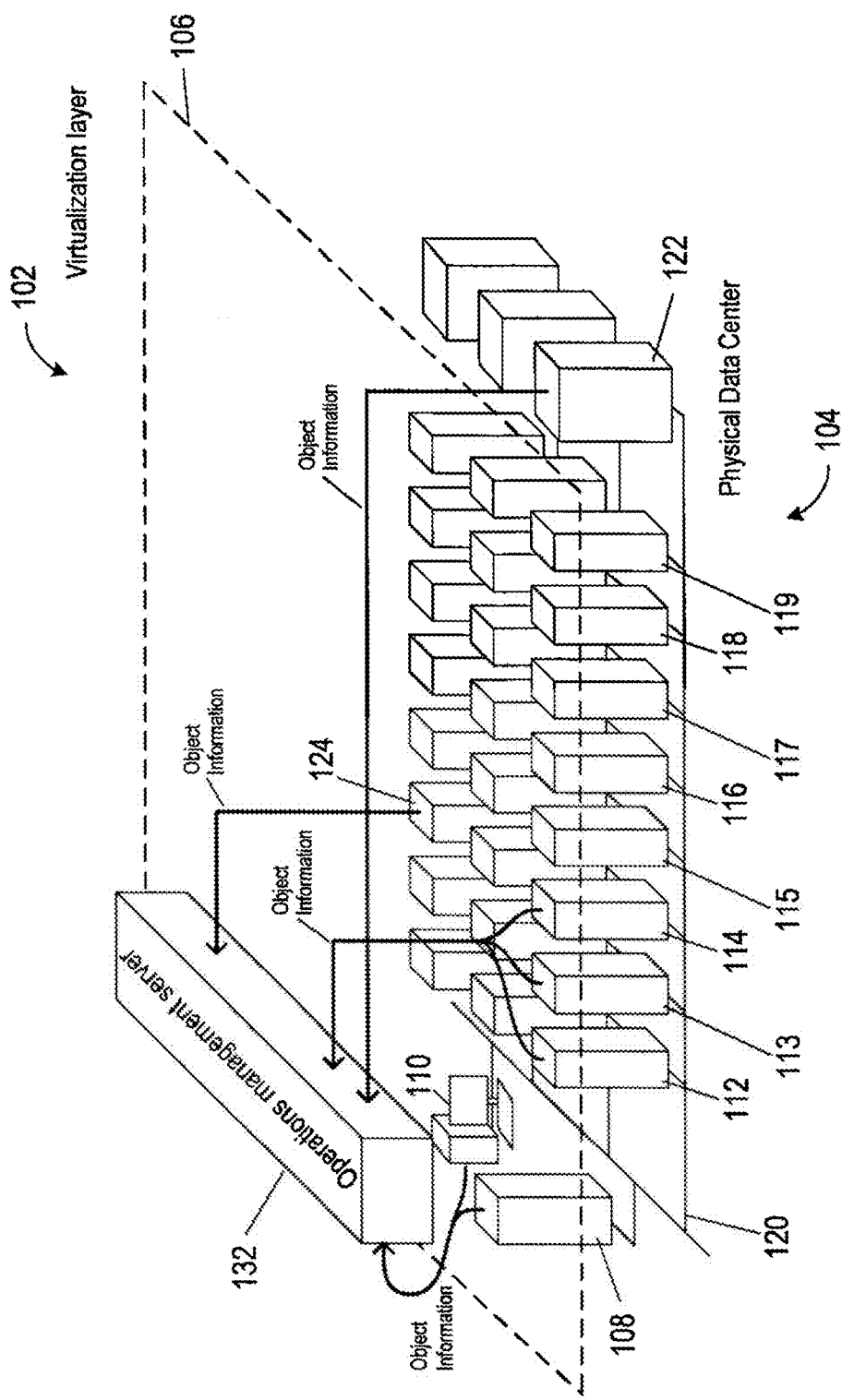
FIGS. 2A-2B shows an operations management server that receives object information from various physical and virtual objects.
Figure 2B:
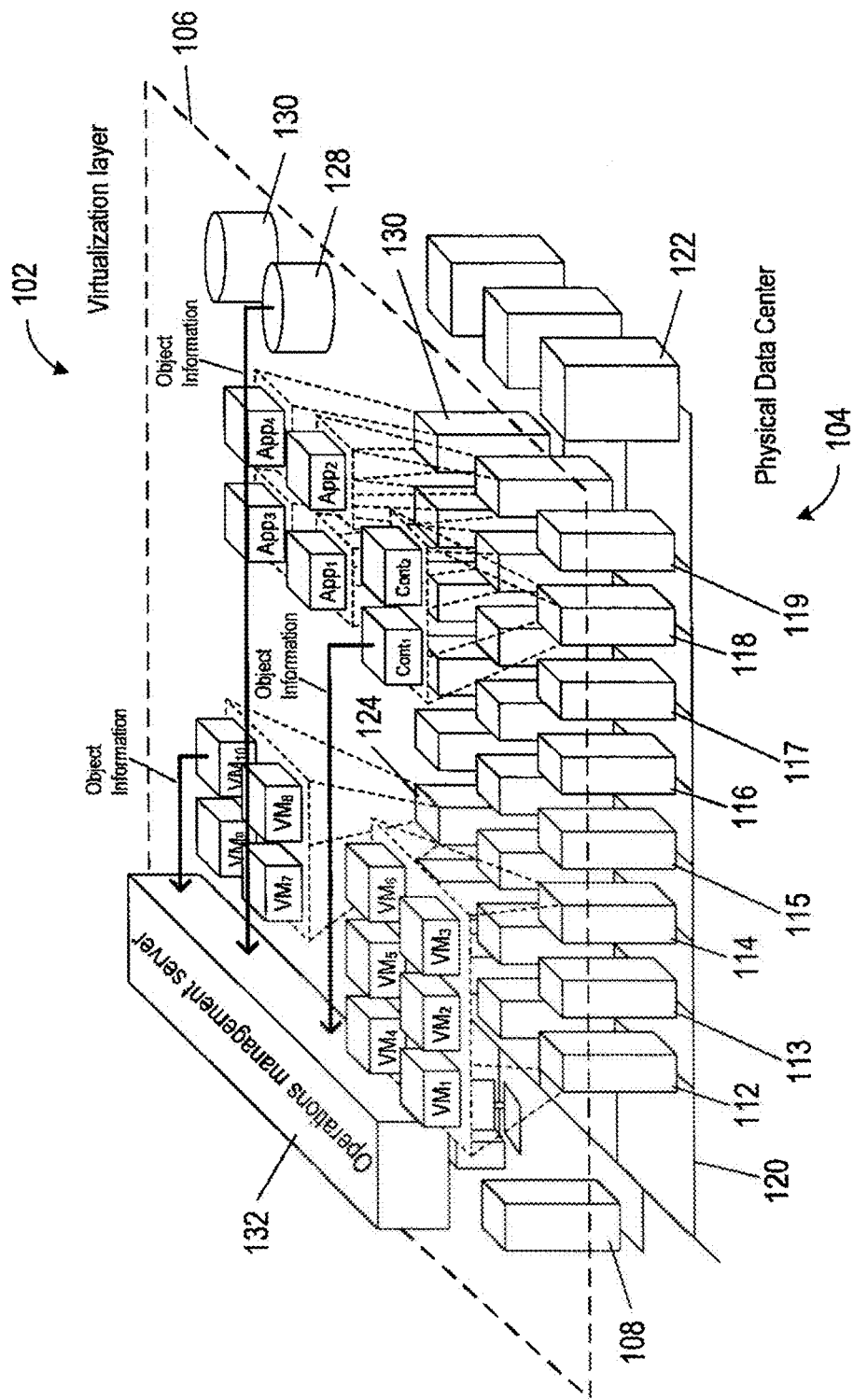

FIGS. 2A-2B show examples of the operations management server 132 receiving object information from various physical and virtual objects. Directional arrows represent object information sent from physical and virtual resources to the operations management server 132. In FIG. 2A, the operating systems of PC 110, server computers 108 and 124, and mass-storage array 122 send object information to the operations management server 132. A cluster of server computers 112-114 send object information to the operations management server 132. In FIG. 2B, the VMs, containers, applications, and virtual storage may independently send object information to the operations management server 132. Certain objects may send metrics as the object information is generated while other objects may only send object information at certain times or when requested to send object information by the operations management server 132. The operations management server 132 may be implemented in a VM to collect and process the object information as described below to detect performance problems, identify the root cause of a performance problem, and may generate recommendations to correct the performance problems or execute remedial measures, such as reconfiguring a virtual network of a VDC or migrating VMs from one server computer to another. For example, remedial measures may include, but are not limited to, powering down server computers, replacing VMs disabled by physical hardware problems and failures, spinning up cloned VMs on additional server computers to ensure that services provided by the VMs are accessible to increasing demand or when one of the VMs becomes compute or data-access bound.

The object information creates a multidimensional space for measuring the performance of the objects of a data center. For example, each of the metrics corresponds to a different dimension in the space, change points in the log messages correspond to other dimensions of the space, and RED metrics correspond to still other dimensions of the space. The operations management server 132 automatically detects events that are recorded in the object information and are associated with anomalous behavior of the objects, identifies a root cause of the performance problems, and generates recommendations and/or executes remedial measures for correcting the performance problems. Detection of events associated with metrics, log messages, traces, and RED metrics are described below.

Metrics

The operations management server 132 receives numerous streams of time-dependent metric data from objects in the data center. Each stream of metric data is time series data that may be generated by an operating system of an object, a resource utilized by the object, or by an object itself. A stream of metric data associated with a resource comprises a sequence of time-ordered metric values that are recorded in spaced points in time called "time stamps." A stream of metric data is called a "metric" and is denoted by $$(x_i)_{i=1}^{N_m} = (x(t_i))_{i=1}^{N_m} \quad (1)$$

where
  $N_m$ is the number of metric values in the sequence;
  $x_i = x(t_i)$ is a metric value;
  $t_i$ is a time stamp indicating when the metric value was recorded in a data-storage device; and
  subscript i is a time stamp index i=1, ..., $N_m$.

Figure 3:
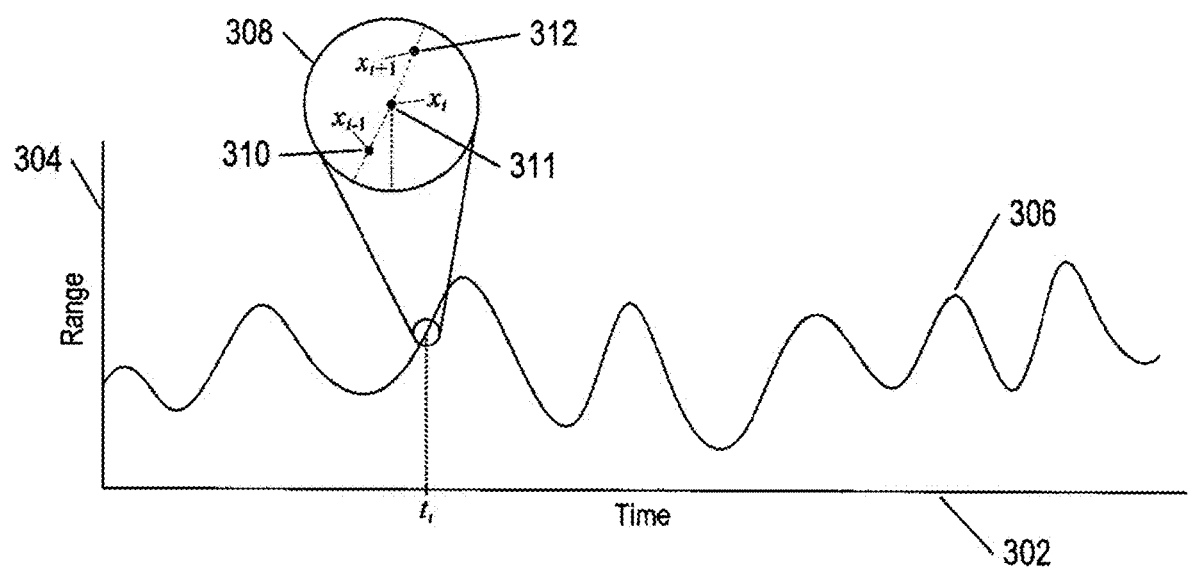
FIG. 3 shows a plot of an example of a metric.

FIG. 3 shows a plot of an example metric. Horizontal axis 302 represents time. Vertical axis 304 represents a range of metric value amplitudes. Curve 306 represents a metric as time series data. In practice, a metric comprises a sequence of discrete metric values in which each metric value is recorded in a data-storage device. FIG. 3 includes a magnified view 308 of three consecutive metric values represented by points. Each point represents an amplitude of the metric at a corresponding time stamp. For example, points 310-312 represent consecutive metric values (i.e., amplitudes) $x_{i-1}$, $x_i$, and $x_{i+1}$ recorded in a data-storage device at corresponding time stamps $t_{i-1}$, $t_i$, and $t_{i+1}$.

Metrics represent different types of measurable quantities of physical and virtual objects of a data center and are stored in a data storage appliance. For example, a metric can represent CPU usage of a core in a multicore processor of a server computer over time. A metric can represent the amount of virtual memory a VM uses over time. A metric can represent network throughput for a server computer. Network throughput is the number of bits of data transmitted to and from a physical or virtual object and is recorded in megabits, kilobits, or bits per second. A metric can represent network traffic for a server computer or a VM. Network traffic at a physical or virtual object is a count of the number of data packets received and sent per unit of time. A metric may can represent object performance, such as CPU contention, response time to requests, latency, and wait time for access to a resource of an object. Network flows are metrics that indicate a level of network traffic. Network flows include, but are not limited to, percentage of packets dropped, data transmission rate, data receiver rate, and total throughput.

Each metric has at least one corresponding threshold, denoted by $Th_{metric}$, that is used to detect an event of object, such as when an object has entered an abnormal state. Depending on the type of metric, the corresponding threshold $Th_{metric}$ can be a dynamic threshold that is automatically adjusted to changes in the object or data center over time or the threshold can be a fix threshold. For example, let $Th_{metric}$ be an upper threshold. When one or more metric values of a metric violate a threshold, such as $x_i > Th_{metric}$ for an upper threshold or $x_i < Th_{metric}$ for a lower threshold, an event has occurred indicating that the corresponding object has entered an abnormal state. Detection of events in metrics is described in U.S. Pat. No. 10,241,887, which is owned by VMware Inc. and is hereby incorporated by reference.

Log Messages

Figure 4:
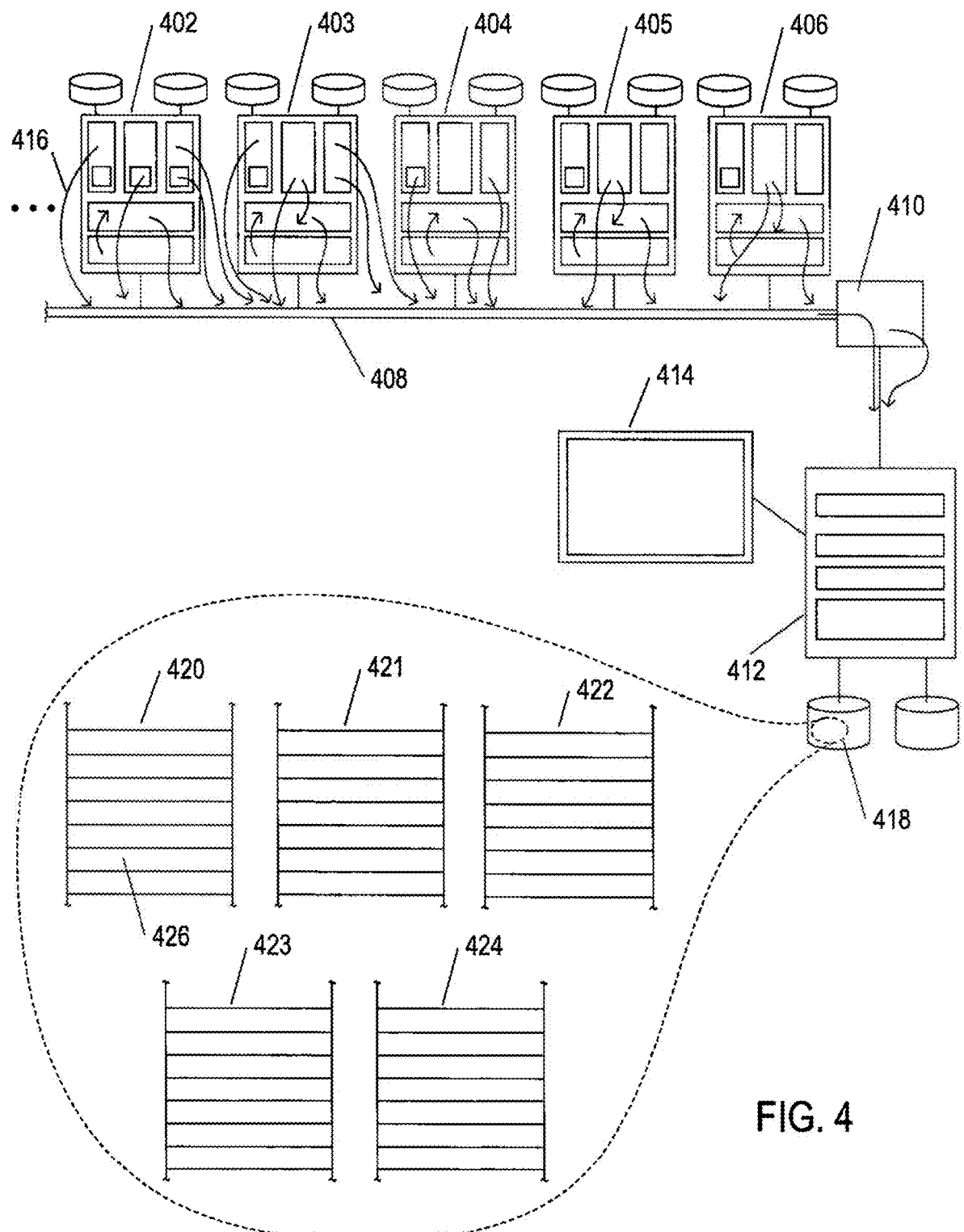
FIG. 4 shows an example of logging log messages in log files.

FIG. 4 shows an example of logging log messages in log files. In FIG. 4, computer systems 402-406 within a data center are linked together by an electronic communications medium 408 and additionally linked through a communications bridge/router 410 to an administration computer system 412 that includes an administrative console 414 and executes a log management server described below. Each of the computer systems 402-406 may run a log monitoring agent that forwards log messages to the operations management server 132 executing on the administration computer system 412. As indicated by curved arrows, such as curved arrow 416, multiple components within each of the computer systems 402-406 as well as the communications bridge/router 410 generate log messages that are forwarded to the operations management server 132. Log messages may be generated by any event source associated with an object of the datacenter. For example, event sources may be, but are not limited to, programs, operating systems, VMs, guest operating systems, containers, network devices, machine codes, event channels, and other computer programs or processes running on the computer systems 402-406, the bridge/router 410 and are associated with the object. Log messages may be received by log monitoring agents at various hierarchical levels within a discrete computer system and then forwarded to the operations management server 132 executing in the administration computer system 412. The operations management server 132 records the log messages in a data-storage device or appliance 418 as log files 420-424. Rectangles, such as rectangle 426, represent individual log messages. For example, log file 420 may contain a list of log messages generated within the computer system 402. Each log monitoring agent has a configuration that includes a log path and a log parser. The log path specifies a unique file system path in terms of a directory tree hierarchy that identifies the storage location of a log file on the administration computer system 412 or the data-storage device 418. The log monitoring agent receives specific file and event channel log paths to monitor log files and the log parser includes log parsing rules to extract and format lines of the log message into log message fields described below. Each log monitoring agent sends a constructed structured log message to the operations management server 132. The administration computer system 412 and computer systems 402-406 may function without log monitoring agents and the operations management server 132, but with less precision and certainty.

Figure 5:
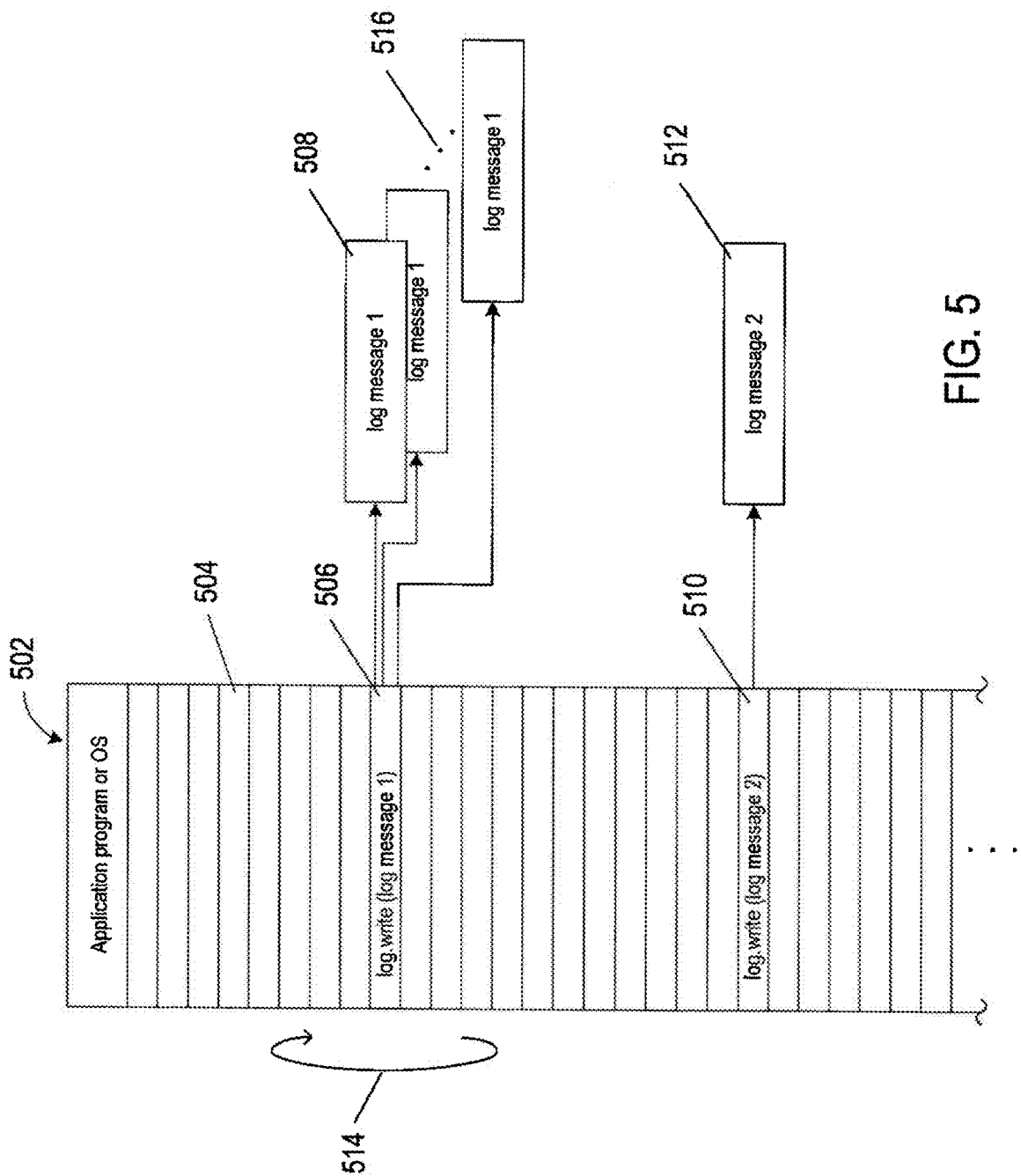
FIG. 5 shows an example source code of an event source.

FIG. 5 shows an example source code 502 of an event source. The event source can be an application, an operating system, a VM, a guest operating system, or any other computer program or machine code that generates log messages. The source code 502 is just one example of an event source that generates log messages. Rectangles, such as rectangle 504, represent a definition, a comment, a statement, or a computer instruction that expresses some action to be executed by a computer. The source code 502 includes log write instructions that generate log messages when certain events predetermined by a developer occur during execution of the source code 502. For example, source code 502 includes an example log write instruction 506 that when executed generates a "log message 1" represented by rectangle 508, and a second example log write instruction 510 that when executed generates "log message 2" represented by rectangle 512. In the example of FIG. 5, the log write instruction 508 is embedded within a set of computer instructions that are repeatedly executed in a loop 514. As shown in FIG. 5, the same log message 1 is repeatedly generated 516. The same type of log write instructions may also be located in different places throughout the source code, which in turns creates repeats of essentially the same type of log message in the log file.

In FIG. 5, the notation "log.write( )" is a general representation of a log write instruction. In practice, the form of the log write instruction varies for different programming languages. In general, the log write instructions are determined by the developer and are unstructured, or semi-structured, and in many cases are relatively cryptic. For example, log write instructions may include instructions for time stamping the log message and contain a message comprising natural-language words and/or phrases as well as various types of text strings that represent file names, path names, and perhaps various alphanumeric parameters that may identify objects, such as VMs, containers, or virtual network interfaces. In practice, a log write instruction may also include the name of the source of the log message (e.g., name of the application program, operating system and version, server computer, and network device) and may include the name of the log file to which the log message is recorded. Log write instructions are written in a source code by the developer of a program or operating system in order to record the state of the application program or operating system at a point in time and to record events that occur while an operating system or application program is executing. For example, a developer may include log write instructions that record informative events including, but are not limited to, identifying startups, shutdowns, I/O operations of applications or devices; errors identifying runtime deviations from normal behavior or unexpected conditions of applications or non-responsive devices; fatal events identifying severe conditions that cause premature termination; and warnings that indicate undesirable or unexpected behaviors that do not rise to the level of errors or fatal events. Problem-related log messages (i.e., log messages indicative of a problem) can be warning log messages, error log messages, and fatal log messages. Informative log messages are indicative of a normal or benign state of an event source.

FIG. 6 shows an example of a log write instruction 602. The log write instruction 602 includes arguments identified with "$" that are filled at the time the log message is created. For example, the log write instruction 602 includes a time-stamp argument 604, a thread number argument 606, and an internet protocol ("IP") address argument 608. The example log write instruction 602 also includes text strings and natural-language words and phrases that identify the level of importance of the log message 610 and type of event that triggered the log write instruction, such as "Repair session" argument 612. The text strings between brackets "[ ]" represent file-system paths, such as path 614. When the log write instruction 602 is executed by a log management agent, parameters are assigned to the arguments and the text strings and natural-language words and phrases are stored as a log message of a log file.

FIG. 7 shows an example of a log message 702 generated by the log write instruction 602. The arguments of the log write instruction 602 may be assigned numerical parameters that are recorded in the log message 702 at the time the log message is executed by the log management agent. For example, the time stamp 604, thread 606, and IP address 608 arguments of the log write instruction 602 are assigned corresponding numerical parameters 704, 706, and 708 in the log message 702. Alphanumeric expression 1910 is assigned to a repair session argument 612. The time stamp 704 represents the date and time the log message 702 was generated. The text strings and natural-language words and phrases of the log write instruction 602 also appear unchanged in the log message 702 and may be used to identify the type of event (e.g., informative, warning, error, or fatal) that occurred during execution of the event source.

Figure 8:
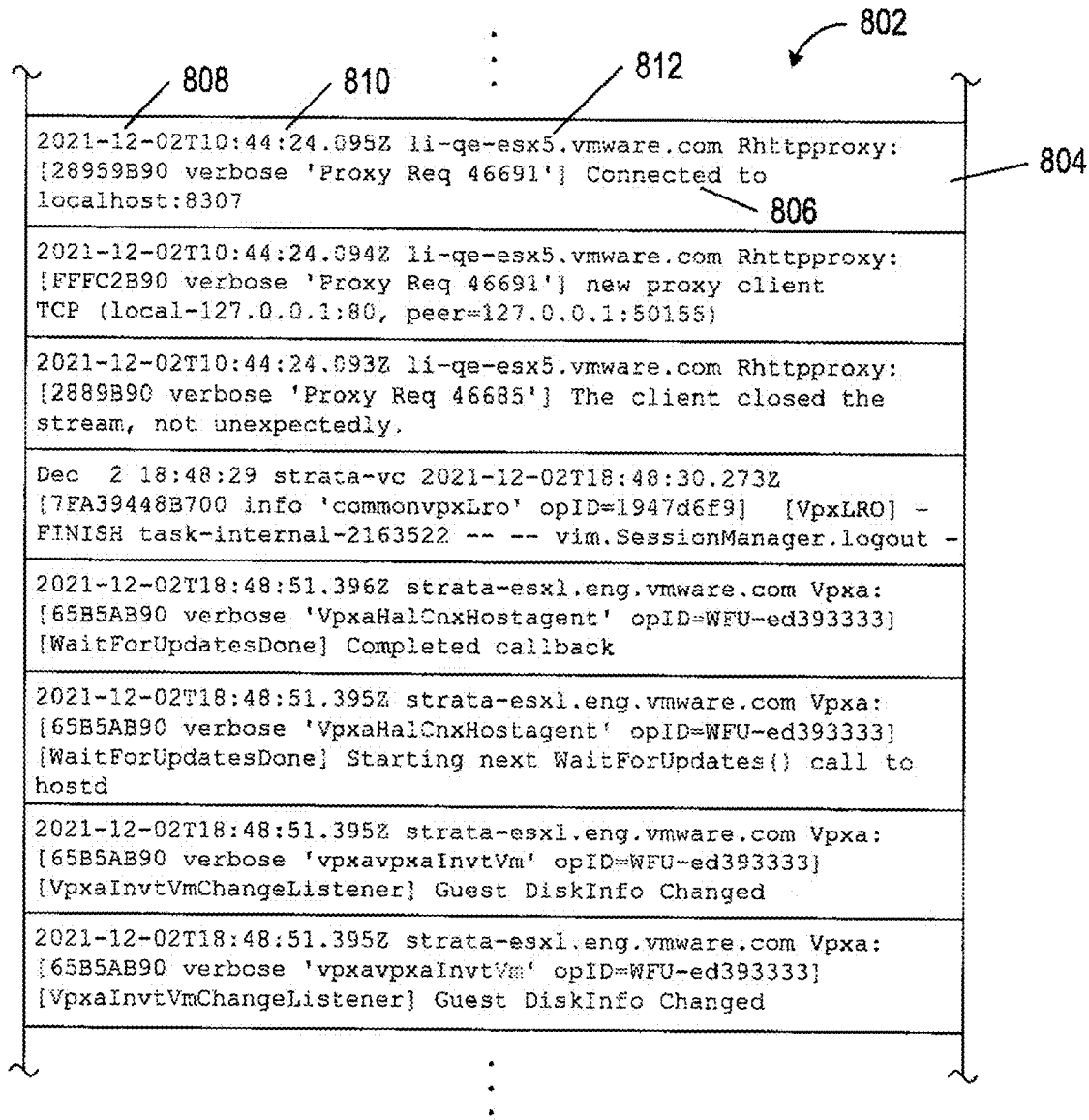
FIG. 8 shows a small, eight-entry portion of a log file.

As log messages are received from various event sources associated with an object of the datacenter, the log messages are stored in corresponding log files in the order in which the log messages are received. FIG. 8 shows a small, eight-entry portion of a log file 802. In FIG. 8, each rectangular cell, such as rectangular cell 804, of the log file 802 represents a single stored log message. For example, log message 804 includes a short natural-language phrase 806, date 808 and time 810 numerical parameters, and an alphanumeric parameter 812 that identifies a particular host computer.

In one implementation, the operations management server 132 extracts parametric and non-parametric strings of characters called tokens from log messages using regular expressions. A regular expression, also called "regex," is a sequence of symbols that defines a search pattern in text data. In another implementation, operations management server 132 extracts non-parametric tokens from log messages using Grok expressions. Grok patterns are predefined symbolic representations of regular expressions that reduce the complexity of constructing regular expressions. Different types of regular expressions or Grok expressions are configured to match and extract tokens from the log messages. Numerous log messages may have different parametric tokens but the same set of non-parametric tokens. The non-parametric tokens extracted from a log message describe the type of event, or event type, recorded in the log message. The event type of a log message is denoted by $et_i$, where subscript i is an index that distinguishes the different event types of log messages. Many event types correspond to benign events recorded in log message while event types that describe errors, warning or critical problems are identified by the operation management server 132.

Figure 9:
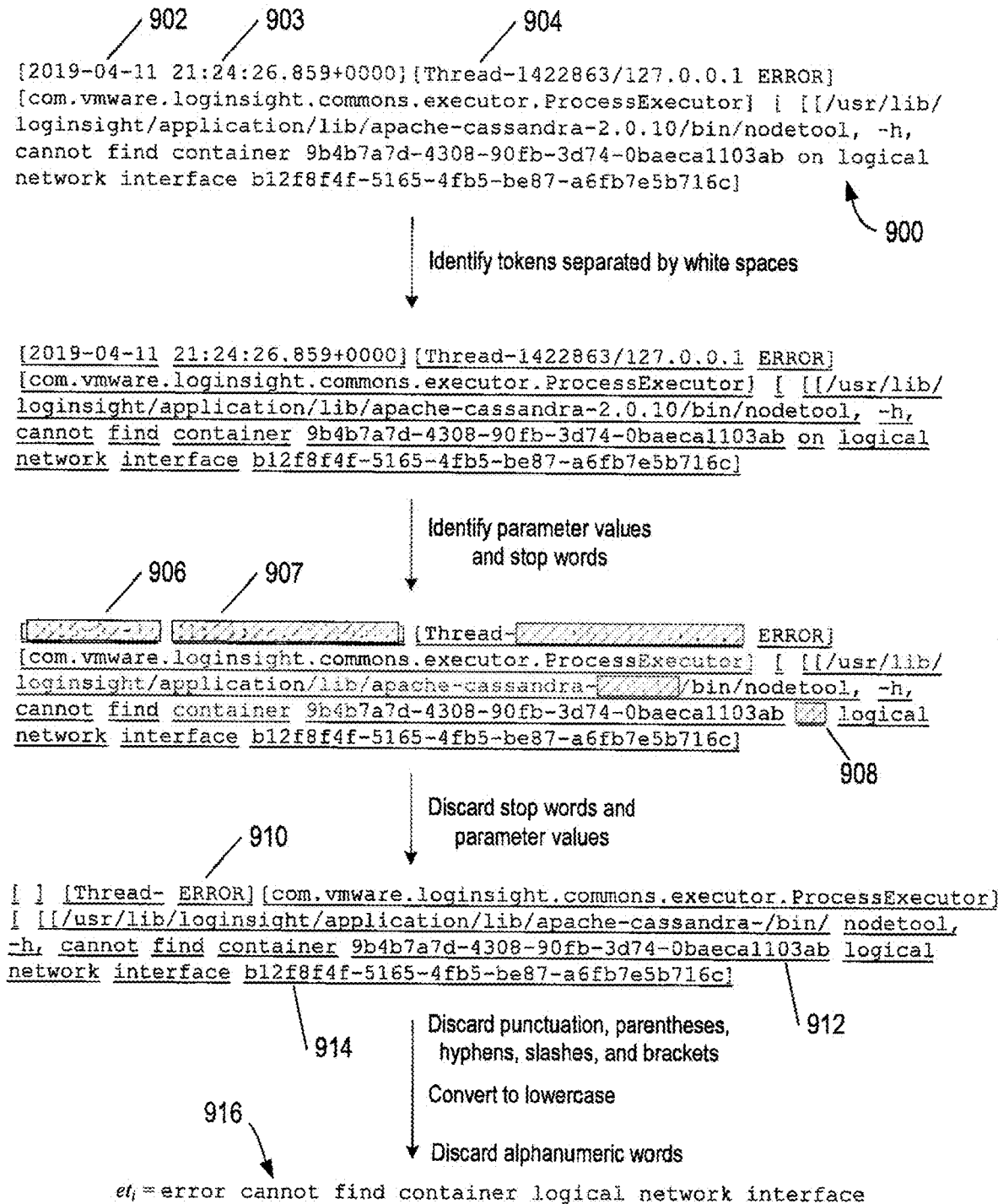
FIG. 9 shows an example of identifying an event type of example log message.

FIG. 9 shows an example of identifying the event type of example log message 900. The log message 900 is tokenized using a corresponding regular expression or a corresponding Grok expression. Tokens of the log message 900 are identified by underlining. For example, the date 902, time 903, and thread 904 of the header are separately underlined and correspond to different tokens. Tokens that correspond stop words are common words, such as "they." "are," "do," do carry any useful information. Parametric tokens that are variable over a set of messages of a particular type, such as date/time stamps. Stop words and parametric tokens are indicated by shading, such as shaded rectangle 906. 907, and 908. Stop words and parametric tokens are discarded leaving the non-parametric tokens, which represent text strings, natural language words and phrases, punctuation, parentheses, and brackets. Various types of symbolically encoded values, including dates, times, machine addresses, network addresses, and other parameters, such as parentheses, brackets, commas, and dashes can be recognized using regular or Grok expressions and discarded. Uppercase letters are converted to lowercase letters. For example, letters of the word "ERROR" 910 are converted to "error." Alphanumeric words 912 and 914, such as interface names and universal unique identifiers, are discarded, leaving plaintext non-parametric tokens 916 that represent the event type of the log message 900.

Unexpected behavior in an object of a data center may be categorized as an anomaly or a change. An anomaly is an extreme event that has essentially the same overall characteristics in the present as in the past. On the other hand, a change is an alteration in the characteristics of the process itself and is regarded an event. A change point is a point in time when the change in behavior of an object begins. The operations management server 132 automatically detects changes, or change events, in an object's behavior based on changes in the distribution of the event types generated by an object.

Figure 10:
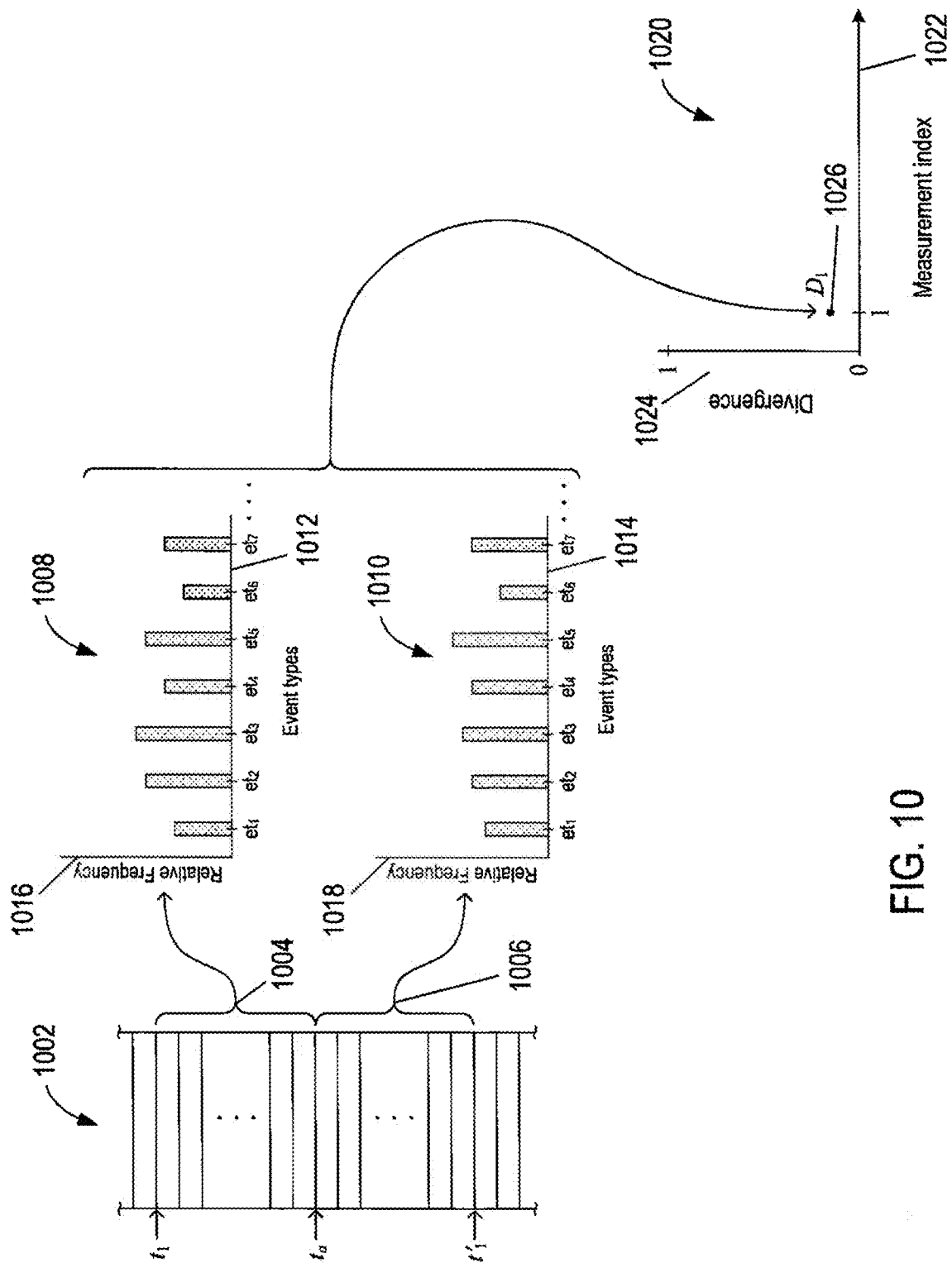
FIG. 10 shows a portion of a log file with time stamps that lie in a time interval.

FIG. 10 shows a portion of a log file 1002 with rectangles that represent log messages with time stamps that lie in the time interval $[t_1, t'_1]$. The time interval $[t_1, t'_1]$ is divided into two sub-time intervals $[t_1, t_a]$ and $[t_a, t'_1]$, where $t_a$ marks a point in which approximately half of the log messages are in each of the sub-time intervals. A first set of log messages 1004 has time stamps in the first time interval $[t_1, t_a]$. A second set of event messages 1006 has time stamps in the second time interval $[t_a, t'_1]$. The operations management server 132 determines the event types for each of the log messages in the separate time intervals and determines the relative frequency of each event type in the separate time intervals. A relative frequency is computed for each event type of the first set of event messages 1004 as follows:

$$F_l = \frac{n_F(et_l)}{N_F} \quad (2a)$$

where
subscript l denotes an event type index;
$n_F(et_l)$ is the number of times the event type $et_l$ appears in the first set of event messages 1004; and
$N_F$ is the total number event messages in the first set of event messages 1004.

A relative frequency is computed for each event type of the second set of event messages 1006:

$$G_l = \frac{n_G(et_l)}{N_G} \quad (2b)$$

where
$n_G(et_l)$ is the number of times the event type $et_l$ appears in the second set of event messages 1006; and
$N_G$ is the total number event messages in the second set of event messages 1006

FIG. 10 shows a plot of a first event-type distribution 1008 of the event types of the log messages 1004 and a plot of a second event-type distribution 1010 of the event types of the log messages 1006. Horizontal axes 1012 and 1014 represent the various event types. Vertical axes 1016 and 1018 represent relative frequency ranges. Shaded bars represent the relative frequency of each event type.

The operations management server 132 computes a divergence value between the first and second event-type distributions. The divergence value is a quantitative measure of a change event to the object based on changes in the event types in the first and second time intervals. In one implementation, a divergence value is computed between first and second event-type distributions using the Jensen-Shannon divergence:

$$D_i = -\sum_{l=1}^{N_{ET}} M_l \log M_l + \frac{1}{2}\left[\sum_{l=1}^{N_{ET}} F_l \log F_l + \sum_{l=1}^{N_{ET}} G_l \log G_l\right] \quad (3)$$

where
the subscript "i" represents a measurement index;
$M_l = (F_l + G_l)/2$; and
$N_{ET}$ is the number of different event types of the log messages.

In another implementation, the divergence value may be computed using an inverse cosine as follows:

$$D_i = 1 - \frac{2}{\pi}\cos^{-1}\left[\frac{\sum_{l=1}^{N_{ET}} F_l G_l}{\sqrt{\sum_{l=1}^{N_{ET}} (F_l)^2}\sqrt{\sum_{l=1}^{N_{ET}} (G_l)^2}}\right] \quad (4)$$

The divergence value $D_i$ computed according to Equation (3) or (4) satisfies the following condition $$0 \leq D_i \leq 1 \quad (5)$$

The divergence value is a normalized value that is used to measure how much, or to what degree, the first event-type distribution differs from the second event-type distribution. The closer the divergence is to zero, the closer the first event-type distribution is to matching the second event-type distribution. For example, when $D_i=0$, the first event-type distribution is identical to the second event-type distribution, which is an indication that the state of the object has not change from the first sub-time interval $[t_1, t_a]$ to the second sub-time interval $[t_a, t'_1]$. On the other hand, the closer the divergence is to one, the farther the first event-type distribution is from the second event-type distribution. For example, when $D_i=1$, the first and second event-type distributions have no event types in common.

FIG. 10 shows a plot 1020 of an example divergence computed for the first event-type distribution 1008 and the second event-type distribution 1010. Horizontal axis 1022 represents measurement indices. Vertical axis 1024 represents the divergence. Dot 1026 represents the example divergence computed for the first event-type distribution 1008 and the second event-type distribution 1010. Note that the divergence value is close to zero, which indicates the distributions 1008 and 1010 are similar.

The time window is then moved or slides to a next time interval $[t_2, t'_2]$ by a time step denoted by $\delta$. The time step is less than the length of the time window A (i.e., $\delta < \Delta$). For example, the time step may be 30 seconds, 1 minute, 2 minutes, 5 minutes, or of any suitable duration that is less than the length of the time window. As a result, the recent time interval $[t_2, t'_2]$ overlaps the previous time interval $[t_1, t'_1]$.

As the time window incrementally advances or slides in time by the time step $\delta$, a divergence value is computed for event messages generated in the time interval covered by the time window as described above with reference to FIG. 10. The divergence values computed over time form a sequence of divergence values represented by $$DV = (D_i)_{i=1}^{N_l} \quad (6)$$

where
i=1, . . . , N, are measurement indices; and
N, is the number of measurements.

Figure 11:
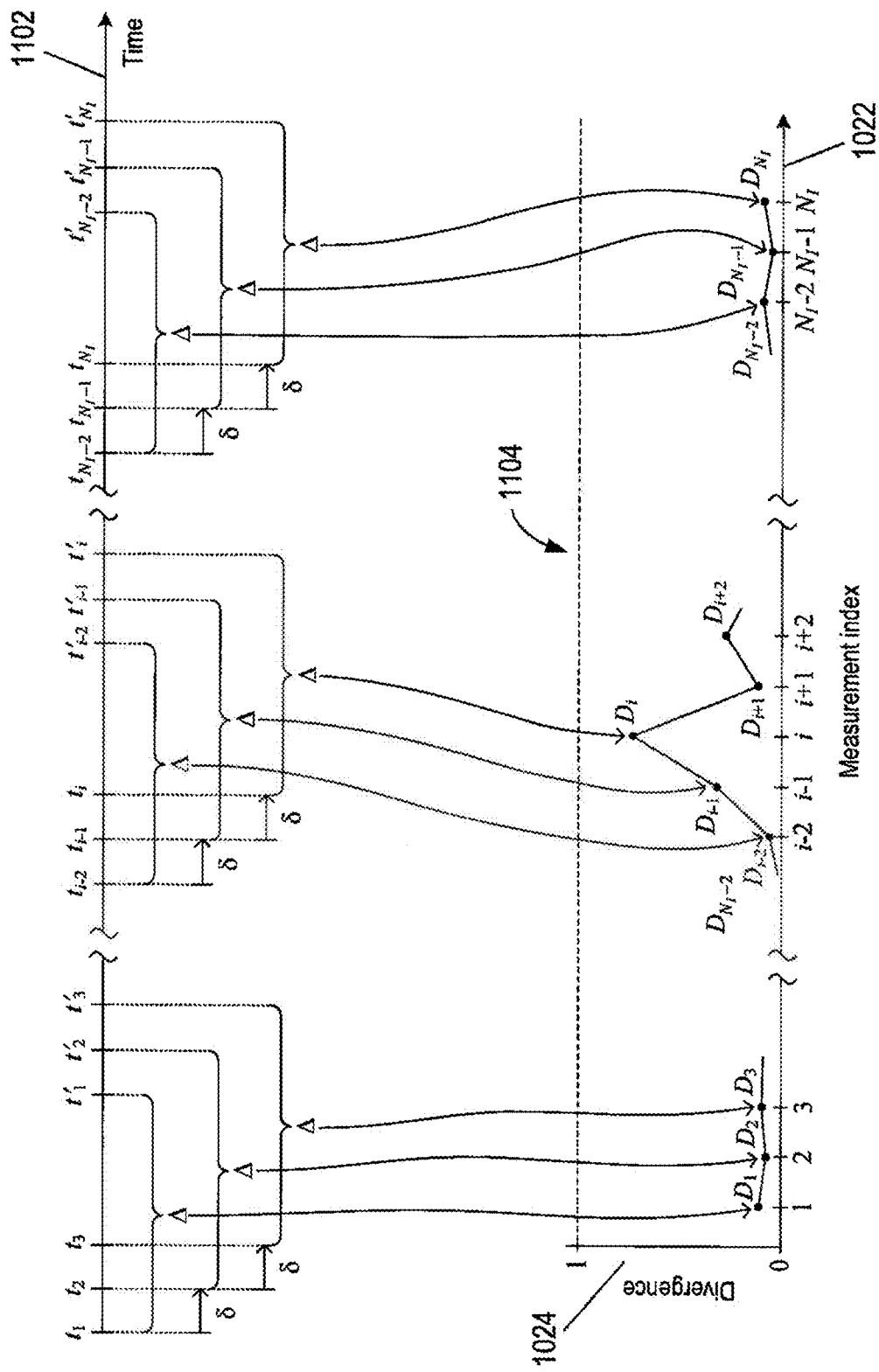
FIG. 11 shows a plot of an example sequence of consecutive divergence values computed for overlapping time windows.

FIG. 11 shows a plot of an example sequence of N consecutive divergence values computed for N overlapping time windows. Overlapping time intervals located on the time axis 1102 correspond to locations of the sliding time window incrementally advanced in time by the time step δ. FIG. 11 includes a plot of divergence values 1104 computed for log messages with time stamps in each time window. Divergence values represented by dots are computed for log messages with time stamps in each of the overlapping time intervals located along the time axis 1102 as described above with reference to FIG. 10. Most of the divergence values are close to zero, which indicates no significant change in the event messages generated by the event sources associated with object over time. On the other hand, larger divergence value $D_n$ 1106 indicates a change has occurred in the object associated with the log messages. However, it is not clear when the change occurred.

When a divergence value is greater than a divergence value threshold $$D_i > Th_{DV} \tag{7}$$

the divergence value indicates a change event has occurred with the object. The divergence value threshold represents a limit for acceptable divergence value changes. For example, the divergence value threshold may be equal to 0.1, 0.15, or 0.2. In other implementations, when a rate of change in divergence values is greater than a rate of change threshold $$D_i - D_{i-1} > Th_R \tag{8}$$

the divergence value $D_i$ indicates a change event in the object. The rate of change threshold represents a limit for acceptable increases between consecutive divergence values. For example, the rate of change threshold may be equal to 0.1, 0.15. or 0.2. When a change event has been determined by either of the threshold violations represented in Equations (7) and (8), change point analysis is applied to the sequence of divergences values in order to quantitatively detect a change point for the object. The change point is then used to determine a potentially earlier start time of change in the object.

Change point analysis includes computing cumulative sums of divergence values as follows:

$$S_i = S_{i-1} + (D_i - \overline{D}) \tag{9}$$

where
$S_0 = 0$;
$i = 1, \ldots, N_I$; and $$\overline{D} = \frac{1}{N_I} \sum_{i=1}^{N_I} D_i$$

is the mean value of the divergence values. In other implementations, rather than using the mean value, $\overline{D}$ is the median of the sequence of divergence values.

The measurement index of the largest cumulative sum value in the sequence of cumulative sum values is given by:

$$S_m = \max((S_i)_{i=1}^{N_I}) \tag{10}$$

where m is the measurement index of the maximum cumulative sum value $S_m$.

The measurement index m is called the chance point. The change point index m is the index of the time interval $[t_m, t'_m]$ in which the change is detected by the maximum cumulative sum. The start time of the change is determined by initially partitioning the divergence values into two sequences of divergence values based on the change point index m as follows:

$$DV = (D_i)_{i=1}^{N_I} = (D_i)_{i=1}^m \cup (D_i)_{i=m+1}^{N_I} \tag{11}$$

The first and second sequences of divergence values $(D_i)_{i=1}^m$ and $(Dt)_{i=m+1}^{N_I}$ are used to compute the mean square error of the sequence of divergences values as follows:

$$MSE(m) = \sum_{i=1}^{m} (D_i - \overline{D}_{1,m})^2 + \sum_{i=m+1}^{N_1} (D_i - \overline{D}_{m+1,N_I})^2 \tag{12}$$

where $$\overline{D}_{1,m} = \frac{1}{m} \sum_{i=1}^{m} D_i$$

$$\overline{D}_{m+1,N} = \frac{1}{N_I - m} \sum_{i=m+1}^{N_I} D_i$$

The quantity $\overline{D}_{1,m}$ is the average of the first sequence of divergence values. The quantity $\overline{D}_{m+1}^{N_I}$ is the average of the second sequence of divergences values. Starting with a measurement index k equal to the change point index m, and decrementing until k=1, a mean square error MSE(k) is computed according to Equation (12) until a mean square error MSE(k) that is less than or equal to MSE(m) is determined. The largest measurement index k that is less than the change point index m and satisfies the condition MSE(k)≤MSE(m) corresponds to a time interval $[t_k, t'_k]$, where the time $t_k$ is the approximate start time of a change event and k is called the start time of change index. If MSE(k)>MSE(m) for k=1, . . . ,m, then the start time of the change event is the change point $t_m$. The following pseudo-code represents one of many different ways of determining a start time of change:

| | |
|---|---|
| 1 | int k = m; |
| 2 | for (k = m − 1; k = 0; k—) |
| 3 | { |
| 4 | compute MSE (k); // using Equation (11) |
| 5 | if (MSE (k) ≤ MSE (m)) |
| 6 | { |
| 7 | Start time of change index = k; |
| 8 | return (Change index); |
| 9 | } |
| 10 | } |
| 11 | Start time of change index = m; |
| 12 | return (Change index); |

The above procedure minimizes the mean square error by decrementing from the measurement index m until a measurement index k that satisfies the condition MSE(k)≤MSE(m) is determined. The resulting start time of change index k is a "best" partition of the divergence values for which the divergence values in the sequence $(D_i)_{i=1}^k$ and the divergence values in the sequence $(D_i)_{i=k+1}^m$ are maximum fits to the respective means of these two sequences.

Traces

Application traces and associated spans are used to identify interesting patterns associated with performance problems with objects. Distributed tracing is used to construct application traces and associated spans. A trace represents a workflow executed by an object, such as a distributed application. For example, a trace represents how a request, such as a user request, propagates through components of a distributed application or through services provided by each component of a distributed application. A trace consists of one or more spans, which are the separate segments of work represented in the trace. Each span represents an amount of time spent executing a service of the trace.

Figure 12A:
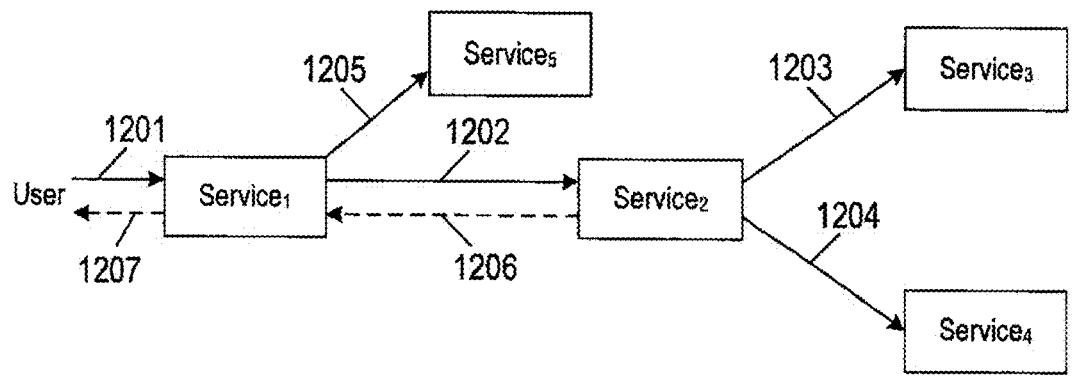
FIGS. 12A-12B show an example of a distributed application and an example application trace.
Figure 12B:
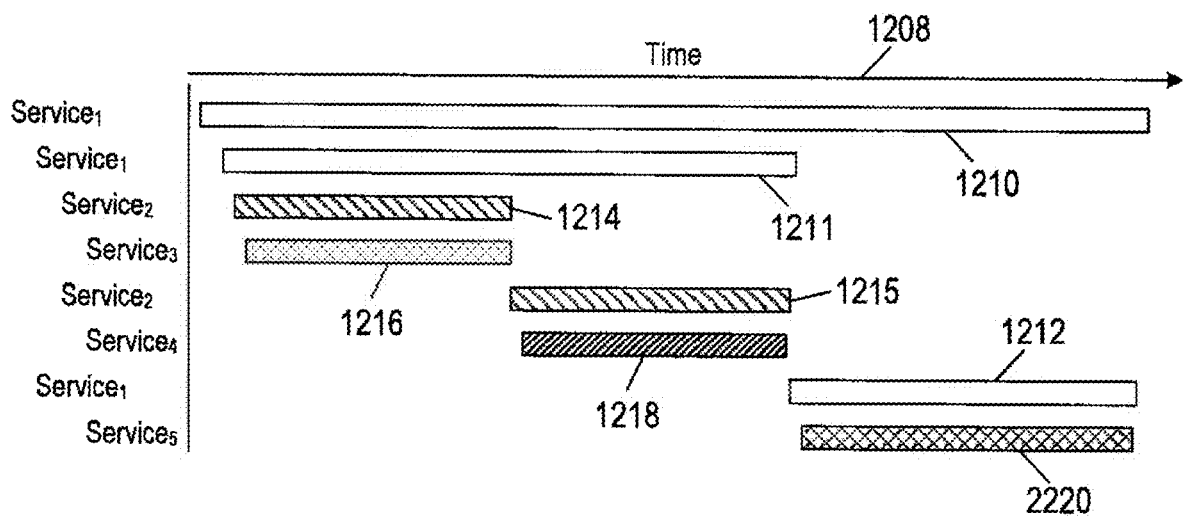

FIGS. 12A-12B show an example of a distributed application and an example trace associated with a distributed application. FIG. 12A shows an example of five services provided by a distributed application. The services are represented by blocks identified as $Service_1$, $Service_2$, $Service_3$, $Service_4$, and $Service_5$. The services may be web services provided to customers. For example, $Service_1$ may be a web server that enables a user to purchase items sold by the application owner. The services $Service_2$, $Service_3$, $Service_4$, and $Service_5$ are computational services that execute operations to complete the user's request. The services may be executed in a distributed application in which each component of the distributed application executes a service in a separate VM on different server computers or using shared resources of a resource pool provided by a cluster of server computers. Directional arrows 1201-1205 represent requests for a service provided by the services $Service_1$, $Service_2$, $Service_3$, $Service_4$, and $Service_5$. For example, directional arrow 1201 represents a user's request for a service, such as provided by a web site, offered by $Service_1$. After a request has been issued by the user, directional arrows 1203 and 1204 represent the $Service_1$ request for execution of services from $Service_2$ and $Service_3$. Dashed directional arrows 1206 and 1207 represent responses. For example, $Service_2$ sends a response to $Service_1$ indicating that the services provided by $Service_3$ and $Service_4$ have been executed. The $Service_1$ then requests services provided $Service_5$, as represented by directional arrow 1205, and provides a response to the user, as represented by directional arrow 1207.

FIG. 12B shows an example trace of the services represented in FIG. 12A. Directional arrow 1208 represents a time axis. Each bar represents a span, which is an amount of time (i.e., duration) spent executing a service. Unshaded bars 1210-1212 represent spans of time spent executing the $Service_1$. For example, bar 1210 represents the span of time $Service_1$ spends interacting with the user. Bar 1211 represents the span of time $Service_1$ spends interacting with the services provided by $Service_2$. Hash marked bars 1214-1215 represent spans of time spent executing $Service_2$ with services $Service_3$ and $Service_4$. Shaded bar 1216 represents a span of time spent executing $Service_3$. Dark hash marked bar 1218 represents a span of time spent executing $Service_4$. Cross-hatched bar 1220 represents a span of time spent executing $Service_5$.

The operations management server 132 constructs and monitors RED metrics from the spans of traces to detect events in the performance of an object, such as the example distributed application described above with reference to FIG. 12A. RED metrics are measures of rate of requests, errors, and durations. A rate of request metric is the number of requests served per unit time. An error metric is the number of failed requests per unit time. A duration metric is a per unit time histogram distribution of the amount of time that each request takes. RED metrics are KPIs of the overall health of an object and the health of the individual services performed by components of the object. RED metrics are used by the operations management server 132 to detect events that are indicators of performance problems. An event occurs when any one of the RED metrics violates a corresponding threshold as described above with reference to Equation (1).

Span RED metrics measure performance of a single service provided by an object. For example, a span rate of request metric is the number of times that the specified operation performed by a service is invoked or the number of spans for a specified service. A span error metric is the number of operations performed by a service that have errors. A span duration metric of each invoked service in microseconds may be aggregated in one-minute intervals. The duration of each span, in microseconds, are aggregated in one-minute intervals.

Trace RED metrics measure traces that start with a given root service. Trace RED metrics measure the number of traces that each start with the same root service. If a trace has multiple root spans, the earliest occurring root span is used. The operations management server 132 derives trace RED metrics from each trace's root span and end span. A trace rate of request metric is the number of traces that start with the specified root service per unit time. A trace error metric is the number of traces that start with the same root service and contain one or more spans with errors. A trace duration metric is measured from the start of the earliest root span to the end of the last span in a trace.

Automated Methods and System for Identifying Problems in Data Center Objects based on Associated Event Distributions Baseline Distribution The operations management server 132 determines a baseline distribution from subsets of events recorded in separate time windows of a historical time period. The time windows have the same duration denoted by $\Delta_{TW}$. Each time window may contain a different set of events, such as metric threshold violations, log message alerts, change points, and erroneous traces identified by RED metric threshold violations. Many of the event distributions in time intervals of the historical time period are associated with normal performance of the object. The operations management server 132 automatically determines a baseline distribution for the object based on the event distributions associated with the normal behavior of the object over the historical time period. The baseline distribution is used as described below to detect runtime performance problems of the object (i.e., while the object is executing or performing operations) and specifically identify a root cause of a performance problem immediately following detection of the runtime performance problem.

Figure 13:
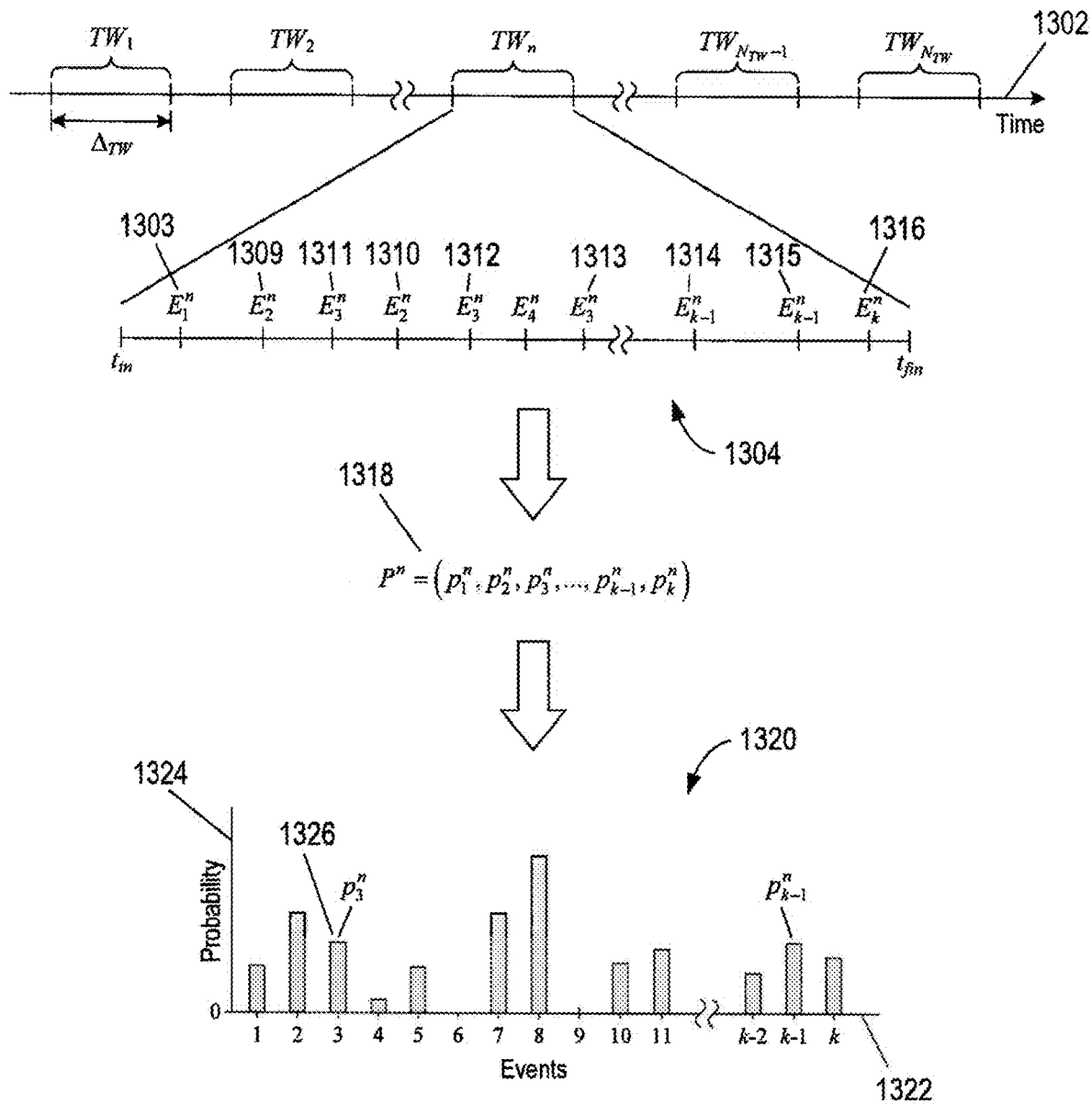
FIG. 13 shows an example of forming event distributions for an object over a historical time period.

FIG. 13 shows an example of forming event distributions for an object over a historical time period 1302. The operations management server 132 establishes $N_{TW}$ non-overlapping time windows denoted by $TW_n$, where $n=1, \ldots, N_{TW}$. The time windows have the same duration denoted by $\Delta_{TW}$. Each time window contains several events associated with an object. Events are denoted by $E_j^n$, where superscript n is the time window index and subscript j is an integer index used to distinguish the different types of events. FIG. 13 shows an expanded view 1304 of the time window $TW_n$. Marks located on time axis 1306 represent points in the time interval $[t_{in}, t_{fin}]$ when events associated with the object described above where recorded. For example, the events $E_1^n$ 1308 has the subscript "1," which denotes a CPU threshold violation. The events $E_2^n$ 1309 and 1310 have the same subscript "2," which denotes a memory threshold violation. The events $E_3^n$ 1311-1313 have the same subscript "3," which denotes a network threshold violation. The events $E_{k-1}^n$ 1314 and 1315 have the same subscript "k-1," which denotes a RED metric threshold violation. The events $E_k^n$ 1316 has the subscript "k" which denotes a change event in the event types of the log messages associated with the object.

The operations management server 132 computes a probability for each type of event for each time window. A probability is computed for each type of event as follows:

$$p_j^n = \frac{n(E_j^n)}{N_E} \tag{13}$$

where
- $n(E_j^n)$ is the number of times the j-th event $E_j^n$ appears in the n-th time window $TW_n$; and
- $N_E$ is the total number events that have occurred in the n-th time window $TW_n$.

The operations management server 132 assembles the probabilities of the different types of events in each of the time windows to form an event distribution associated with each time window. The event distribution associated with the n-th time window $TW_n$ is given by $$P^n = (p_1^n, \ldots, p_j^n, \ldots, p_k^n) \tag{14}$$

Note that event distributions may also have zero probabilities which correspond events that can be associated with the object but did not occur in the time window. For example, an event $E_j^n$ may occur repeatedly in the time window $TW_n$ and has a corresponding non-zero probability $p_j^n$. Alternatively, the same event $E_j^{n+1}$ may not have occurred in the subsequent time window $TW_{n+1}$ and has a corresponding zero probability $p_j^{n+1} = 0$.

Returning to FIG. 13, the event distribution associated with the n-th time window $TW_n$ is denoted by $P^n$ 1318. FIG. 13 also shows an example plot of a probability distribution 1320. Horizontal axis 1322 identifies the indices of the types of events. Vertical axis 1324 is a probability range. Bars represent the values of the probabilities of the events. For example, bar 1326 represents the value of the probability $p_3^n$. Note that the probability distribution 1318 also includes zero probabilities $p_6^n$ and $p_9^n$ for the corresponding types of events $E_6^n$ and $E_9^n$, which means the types of events $E_6^n$ and $E_9^n$ did not occur in the time window $TW_n$.

In one implementation, operations management server 132 determines a baseline distribution from L dominant distributions of the N event distributions associated with the N time windows of the historical time period based on the binomial cumulative distribution. The binomial distribution depends on the probability of a success, denoted by p. In this implementation, the probability of a success is the probability of finding the object in a normal operational state. The normal state probability p may be determined by monitoring a KPI as described above over time. For example, suppose a KPI for an object is monitored for a week, or two weeks or even longer, and the object was in a normal operation state (i.e., no KPI threshold violation) for 90% of the time. The probability of a success (i.e., probability of a normal state) is p=0.90. On the other hand, the object was in an abnormal state 10% of the time, which is considered a failure. Each randomly sampled time window of the historical time period is independent and does not change the probability of randomly selecting another time window in which the object is in a normal state.

The binomial distribution gives the probability of randomly selecting L event distributions from the N event distributions in which the object is a normal operational state:

$$\text{Prob}(L \text{ successes in } N \text{ trials}) = \binom{N}{L} P^L (1-P)^{N-L} \tag{15a}$$

where $$\binom{N}{L} = \frac{N!}{L!(N-L)!}$$

The probability of randomly selecting L or more event distributions that correspond to the object in a normal operational state is computed from the cumulative binomial distribution:

$$P_{cum}(X \geq L) = \sum_{i=L}^{N} \binom{N}{i} P^i (1-P)^{N-i} \tag{15b}$$

where $L \leq N$.

The cumulative binomial distribution of Equation (15b) is a confidence level for randomly selecting L or more of the N event distributions that correspond to the object in a normal state.

Figures 14, 15:
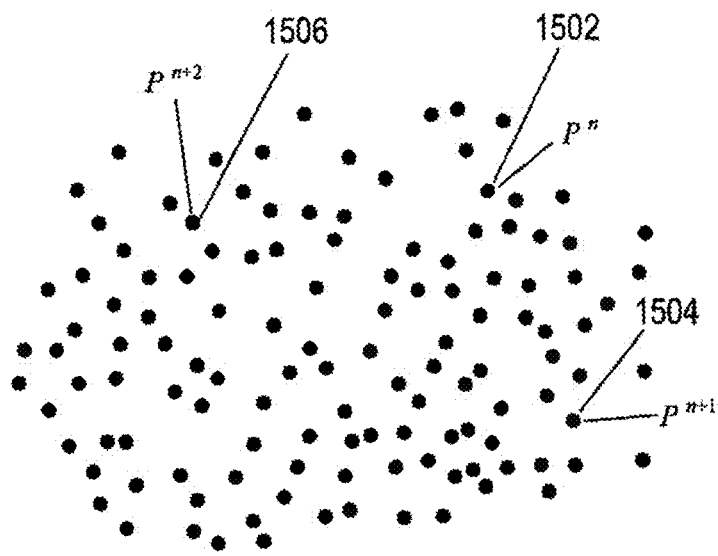
FIG. 14 shows a table of five examples of normal state probabilities and confidence levels.
FIG. 15 shows an example plot of points that represent event distributions in multidimensional space.

FIG. 14 shows a table of five examples of normal state probabilities and confidence levels that L randomly selected event distributions of the N event distributions correspond to different normal state probabilities. Column 1402 list possible probabilities that the object is found in a normal state (i.e., success). Column 1404 list the number of trial time windows N. In this example, suppose the number of time windows is 10 (i.e., N=10). Column 1406 is the minimum number of L event distributions that can be selected with a confidence level in column 1408. In this example, the confidence is set to 0.9995. When the normal state probability is p=0.99, the confidence level of 0.9998 indicates that event distributions are computed for eight (i.e., L=8) randomly selected event distributions. When the normal state probability is p=0.95, the confidence level of 0.9999 indicates that event distributions are computed for six (i.e., L=6) randomly selected event distributions. When the normal state probability is p=0.90, the confidence level of 0.9998 indicates that event distributions are computed for five (i.e., L=5) randomly selected event distributions. When the normal state probability is p=0.85, the confidence level of 0.9998 indicates that event distributions are computed for five (i.e., L=4) randomly selected event distributions. When the normal state probability is p=0.60, the confidence level of 0.9998 indicates that event distributions are computed for only one (i.e., L=5) randomly selected event distributions.

The set of L event distributions that have been randomly selected from the N event distributions are referred to as dominant distributions given by:

$$\text{Dominant} = \{\overline{P}^1, \overline{P}^2, \ldots, \overline{P}^L\} \tag{16}$$

where the overbar denotes an event distribution that is a dominant distribution.

The operations management server 132 determines a baseline distribution from the set of dominant distributions according to the maximum entropy principle. The operations management server 132 computes the entropy for each of the L dominant distributions as follows:

$$H(\overline{P}^l) = -\sum_{j=1}^{k} \overline{p}_j^l \log_2 \overline{p}_j^l \tag{17}$$

where l=1, ..., L.

The maximum entropy is given by $$H_{max} = \max\{H(\overline{P}^1), \ldots, H(\overline{P}^L)\} \quad (18)$$

The dominant distribution with the largest corresponding entropy, $H_{max}$, is as the baseline distribution for the object in the normal operational state and is denoted by $$P^b = (p_1^b, \ldots, p_j^b, \ldots, p_k^b) \quad (19)$$

where the superscript "b" denotes the baseline distribution.

In another implementation, the operations management server 132 determines the baseline distribution using local outlier factor ("LOF") analysis of the N event distributions computed for the N time windows of the historical time period. Each event distribution occupies a point in a k-dimensional space.

FIG. 15 shows an example plot of points that represent event distributions. Although the points are shown in two-dimensions, the points represent event distributions in a k-dimensional space. For example, point 1502 represents the event distribution $P^n$, point 1504 represents the event distribution $P^{n+1}$, and point 1506 represents the event distribution $P^{n+2}$.

The operations management server 132 computes an LOF for each of the event distributions. Computation of an LOF for each event distribution begins by computing a distance between each pair of event distributions. In certain implementations, the distance between each pair of event distributions is computed using a cosine distance:

$$Dist_{CS}(P^n, P^m) = \frac{2}{\pi} \cos^{-1}\left[\frac{\sum_{j=1}^{k} p_j^n p_j^m}{\sqrt{\sum_{j=1}^{M}(p_j^n)^2}\sqrt{\sum_{j=1}^{M}(p_j^m)^2}}\right] \quad (20a)$$

The closer the distance $Dist_{CS}(P^n, P^m)$ is to zero, the closer the event-type distributions $P^n$ and $P^m$ are to each other. The closer the distance $Dist_{CS}(P^n, P^m)$ is to one, the farther distributions $P^n$ and $P^m$ are from each other. In another implementation, the distance between event-type distributions may be computed using Jensen-Shannon divergence:

$$Dist_{JS}(P^n, P^m) = \\ -\sum_{j=1}^{k} M_j \log_2 M_j + \frac{1}{2}\left[\sum_{j=1}^{k} p_j^n \log_2 p_j^n + \sum_{j=1}^{k} p_j^m \log_2 p_j^m\right] \quad (20b)$$

where $M_m = (p_j^n, p_j^m)/2$.

The Jensen-Shannon divergence ranges between zero and one and has the property that the distributions $P^n$ and $P^m$ are similar the closer $Dist_{JS}(P^n, P^m)$ is to zero and are dissimilar the closer $Dist_{JS}(P^n, P^m)$ is to one. In the following discussion, the distance $Dist(P^n,P^m)$ represents the distance $Dist_{CS}(P^n, P^m)$ or the distance $Dist_{JS}(P^n, P^m)$.

For each event distribution $P^n$, $n=1, \ldots, N$, the distances $Dist(P, P^m)$ are rank ordered for $m=1, \ldots, N$ and $m \neq n$. The K-th nearest neighbor distance of the rank ordered distances for the event distribution $P^n$ is determined and denoted by $Dist_K(P^n)$, where K is a selected natural number. The K-th nearest neighbor distance $Dist_K(P^n)$ is called the K-distance. Given the K-distance, a K-distance neighborhood of event-type distributions with a distance to the event-type distribution $P^n$ that is less than or equal to the K-distance is given by:

$$N_K(P^n) = \{P^m \in C\backslash\{P^n\} | Dist(P^n,P^m) \leq Dist_K(P^n)\} \quad (21)$$

A local reachability density is computed for the event distribution $P^n$ as follows:

$$lrd(P^n) = \frac{\|N_K(P^n)\|}{\sum_{ET_j \in N_K(P^n)} \text{reach-}dist_K(P^n, P^m)} \quad (22)$$

where $\|N_K(P^n)\|$ is the number of event distributions in the K-distance neighborhood $N_K(P^n)$; and reach-$dist_K(P^n, P^m)$ is the reachability distance of the event distribution $P^n$ to the event distribution $P^m$.

The reachability distance is given by:

$$\text{reach-}dist_K(P^n,P^m) = \max\{Dist_K(P^n), Dist(P^n,P^m)\} \quad (23)$$

where $m=1, \ldots, N$ and $m \neq n$.

An LOF is computed for the event-type distribution $ET_i$ as follows:

$$LOF(P^n) = \frac{\sum_{ET_j \in N_K(P^n)} \frac{lrd(P^m)}{lrd(P^n)}}{\|N_K(P^n)\|} \quad (24)$$

The LOF of Equation (21) is an average local reachability density of the neighboring coordinate data points divided by the local reachability density. An LOF is computed for each event distribution in the k-dimensional space.

The LOF's determined for the event distributions are rank ordered and an event distribution with the smallest corresponding LOF is the baseline distribution. In other words, the baseline distribution $P^b$ satisfies the condition $LOF(P^b) \leq LOF(P^n)$ for $n=1, \ldots, N$ and $b \neq n$. Ideally, the smallest LOF is unique and the corresponding event distribution is the baseline distribution as represented by Equation (19). In the case where them are two or more equal value LOF minima, the corresponding two or more event-type distributions are candidate baseline distributions. Entropies are computed for the two or more candidate baseline distributions. The candidate baseline distribution with the largest corresponding entropy is identified at the baseline distribution. For example, suppose there are two candidate baseline distributions $P^{b_1}$ and $P^{b_2}$ with minimum $LOF(P^{b_1}) = LOF(P^{b_2})$. The corresponding entropies of the two candidate baseline distributions are computed as follows:

$$H(P^{b_1}) = -\sum_{j=1}^{k} p_j^{b_1} \log_2 p_j^{b_1} \quad (25a)$$

$$H(P^{b_2}) = -\sum_{j=1}^{k} p_j^{b_2} \log_2 p_j^{b_2} \quad (25b)$$

If $H(P^{b_1}) > H(P^{b_2})$, then the candidate baseline distribution $P^{b_1}$ is the baseline distribution.

If $H(P^{b_2}) > H(P^{b_1})$, then the candidate baseline distribution $P^{b_2}$ is the baseline distribution.

Runtime Distribution

While the object is in use executing or performing computational operations, the operations management server 132 computes a runtime distribution for the object in a runtime window $TW_r$ with the duration of $\Delta_{TW}$:

$$P^r = (p_1^r, \ldots, p_j^r, \ldots, p_k^r) \quad (26)$$

where
- the superscript "r" denotes a runtime event distribution; and
- $p_j^r$ denotes a probability of the event $E_j^r$ occurring in the runtime window.

Probabilities of the events occurring in the runtime distribution are computed for each type of event associated with the object as follows:

$$p_j^r = \frac{n(E_j^r)}{N_r} \tag{27}$$

where
- $n(E_j^r)$ is the number of times the j-th event $E_j^r$ appears in runtime window $TW_r$; and
- $N_r$ is the total number events that have occurred in the runtime window $TW_r$.

The runtime probabilities are immediately computed when the end of the time window is reached. The runtime window may be a sliding runtime window that advances at an increment that is less than the duration $\Delta_{TW}$ of the runtime window. For example, if the duration of the sliding runtime window is 2 minutes, the sliding increment maybe 30 seconds.

Detecting an Abnormal Operational State of the Object

In one implementation, certain metrics called key performance indicators ("KPIs") are used to monitor the object and detect performance problems and trigger an alert in real time when an object of the datacenter enters an abnormal operational state. The alert can be displayed in the GUI of a systems administrator's display or monitor. Examples of KPIs include a latency metric and throughput metric. The latency metric is the time interval between sending a request to a program or hardware and receiving a response from the program or hardware. For example, when the latency metric exceeds a corresponding threshold (e.g., $x(t_i)^{latency} > Th_{latency}$), an alert is triggered in real time and displayed on the GUI of a systems administrator's display or monitor. The throughput metric is a measure of data packets transmitted per unit time and function of the support capacity of the object and the current load on the object. For example, when the throughput metric falls below a corresponding threshold (e.g., $x(t_i)^{latency} > Th_{latency}$), an alert is triggered in real time and displayed on the GUI of a systems administrator's display or monitor.

In another implementation, as alternative to, or in conjunction with, monitoring a KPI to detect a runtime performance problem with the object, the operations management server 132 computes an expected deviation, or expected drift, from the baseline distribution as the largest distance between the baseline distribution and each of the dominant distributions. The expected deviation is determined by computing the distance between the baseline distribution and each of the dominant distributions, $Dist(P^b, \overline{P}^l)$, where $l=1, \ldots, L$ and $P^b \neq \overline{P}^l$, is computed as described above with reference to Equation (20a) or (20b). The expected deviation (or drift) is given by $$\text{MaxDist} = \max\{Dist(P^b, \overline{P}^1), \ldots, Dist(P^b, \overline{P}^L)\} \tag{28}$$

In another implementation, the distances in Equation (28) are $Dist(P^b, P^n)$, where $n=1, \ldots, N$ and $P^b \neq P^n$. The expected deviation, or expected drift, MaxDist is an acceptability limit, or threshold, for determining how far the runtime distribution can deviate from the baseline distribution for the object.

The operations management server 132 monitors performance of the object by computing the distance $Dist(P^b, P^r)$ between the baseline distribution and the most recently obtained runtime distribution. When the distance satisfies the following condition $$Dist(P^b, P^r) \leq \text{MaxDist} \tag{29a}$$

the object is in a normal operational state and no alerts are triggered. Alternatively, when the distance between the baseline distribution and the runtime distribution satisfies the following condition:

$$Dist(P^b, P^r) > \text{MaxDist} \tag{29b}$$

the object is operating in an abnormal operational state, which immediately triggers an alert in the GUI of the systems administrator and message identifying the object as being in an abnormal operational state is displayed in the operations management interface.

In another implementation, the operations management server 132 monitors performance of the object by computing a discrepancy radius that is used to detect when the object has entered an abnormal operations state. The discrepancy radius is computed by computed a mean distance from the baseline distribution to other event distributions as follows:

$$\mu(P^b) = \frac{1}{N-1} \sum_{n=1, n \neq b}^{N} Dist(P^b, P^n) \tag{30a}$$

A standard deviation of distances from the baseline distribution to other event distributions is computed as follows:

$$std(P^b) = \sqrt{\frac{1}{N-1} \sum_{n=1, n \neq b}^{N} \left(Dist(P^b, P^n) - \mu(P^b)\right)^2} \tag{30b}$$

When the distances between the event distributions are normally distributed about the mean given by Equation (30a), the discrepancy radius is given by:

$$DR_{\pm} = \mu(P^b) \pm B \times std(P^b) \tag{31}$$

where B is an integer number of standard deviations (e.g., B=3) from the mean in Equation (30a).

The discrepancy radius is centered at the mean distance from the baseline distribution to other event distributions given by Equation (31). The mean distance from the runtime distribution $P^r$ to the N event distributions is given by:

$$Dist^{Ave}(P^r) = \frac{1}{N} \sum_{n=1}^{N} Dist(P^r, P^n) \tag{32}$$

When the mean distance in Equation (32) of the runtime distribution $P^r$ satisfies the following condition:

$$DR_- \leq Dist^{Ave}(P^r) \leq DR_+ \tag{33a}$$

the object is in a normal operational state. On the other hand, when the mean distance in Equation (32) satisfies either of the following conditions:

$$Dist^{Ave}(P^r) \leq DR_- \text{ or } DR_+ \leq Dist^{Ave}(P^r) \tag{33b}$$

the runtime distribution is outside the discrepancy radius and the object is in an abnormal state, which immediately triggers an alert in the GUI of the systems administrator as described above.

Additional thresholds may be used to identify a severity level for the abnormal operational state of the object. In one implementation, additional severity-level thresholds that distinguish severity levels of abnormal behavior of the object can be used to generate alerts that identify the severity of the problem as follows:

$$DR_+ < Th_1^+ < Th_2^+ \tag{33c}$$

When $DR_+ < Dist^{Ave}(P^r) < Th_1^-$ an alert may be triggered indicating the state of the object as a warning. When $Th_1^+ < Dist^{Ave}(P^r) < Th_2^+$, an alert may be triggered as indicating the state of the object as indicating an error. When $Th_2^+ < Dist^{Ave}(ET_{rt})$, an alert may be triggered as indicating the state of the object is critical. Analogous severity-level thresholds may be defined and used with $DR_-$ as follows:

$$DR_- > Th_1^- > Th_2^- \tag{33d}$$

When $DR_- > Dist^{Ave}(P^r) > Th_1^-$ the alert may be identified as a warning. When $Th_1^- > Dist^{Ave}(P^r) > Th_2^-$, the alert may be identified as an error. When $Th_2^- > Dist^A(P^r)$, the alert may be identified as critical and the object may be shut down or taken off line.

In an alternative implementation, when the shape of the distances of the event distributions about the mean given by Equation (30a) is unknown, the Chebyshev's inequality may be used to compute a discrepancy radius given by:

$$DR_\pm = \mu(P^b) \pm k \times std(P^b) \tag{34}$$

where $k > 1$.

The value of k in Equation (34) can be determined by the Chebyshev inequality:

$$P(|Dist^{Ave}(P^r) - \mu(P^b)| \geq k \cdot std(P^b)) \leq \frac{1}{k^2} \tag{35}$$

where $$k = \frac{|Dist^{Ave}(P^r) - \mu(P^b)|}{std(P^b)} \tag{36}$$

When the type distribution of the distances given by Equation (32) about the mean is unknown, the discrepancy radius given in Equation (34) can be used in Equations (33a)-(33d) to detect when the object is in an abnormal operational state and immediately trigger an alert.

Object has Different Operational Modes

An object can operate in different normal state modes subject to stress levels or workloads the object supports. For example, an object may have high, medium, and low normal operational states. The operations management server 132 computes a baseline distribution for each of these modes. For example, a VM may have a high normal operational state in which about 85% of the CPU is used by the VM, which is a high utilization mode. On the other hand, the same VM may have a low normal operation state in which less than 50% of the CPU is used by the VM, which is a low utilization mode. The operations management server 132 computes a baseline distribution for each of the normal operation state modes.

The event distributions in the k-dimensional space may have clusters of event distributions according to the different normal state modes. Clustering techniques may be used to determine the K different clusters of event distributions. Each cluster corresponds to a different normal operational state mode and has a different corresponding baseline distribution. The operations management server 132 performs K-means clustering to the full set of N event distributions with an initial set of cluster centroids denoted by $\{Q_q\}_{q=1}^K$. The locations of the K cluster centers are recalculated with each iteration to obtain K clusters. Each event distribution $P^n$ assigned to one of the K clusters defined by:

$$C_q^{(m)}\{p^n : |p^n - Q_q^{(m)}| \leq |P^n - Q_q^{(m)}| \forall q, 1 \leq q \leq K\} \tag{37}$$

where
$C_q^{(m)}$ is the q-th cluster q=1,2, ..., K; and
m is an iteration index m=1, 2, 3, ....

The cluster centroid $Q_q^{(m)}$ is the mean value of the event distribution in the q-th cluster, which is computed as follows:

$$Q_q^{(m+1)} = \frac{1}{|C_q^{(m)}|} \sum_{P^n \in C_q^{(m)}} P^n \tag{38}$$

where $|C_q^{(m)}|$ is the number of event distributions in the q-th cluster.

For each iteration m, Equation (37) is used to determine if an event distribution $P^n$ belong to the q-th cluster followed by computing the cluster center according to Equation (38). The computational operations represented by Equations (37) and (38) are repeated for each value of m until the event-type distributions assigned to the K clusters do not change. The resulting clusters are represented by:

$$C_q = \{P^a\}_{a=1}^{N_q} \tag{39}$$

where
$N_q$ is the number of event distributions in the cluster $C_q$; q=1,2, ..., K; and
a is the event distribution index for event distributions that belong to the cluster $C_q$.

In one implementation, the operations management server 132 computes a baseline distribution for each cluster using LOF analysis as described above with reference to Equations (20a)-(24).

In another implementation, for each of the K clusters, the operations management server 132 identifies an event distribution with the minimum average distance to the other event distributions in the same cluster as the baseline distribution. For each cluster, the average distance of each event distribution in the cluster $C_q$ is computed by:

$$Dist^{Ave}(P^a) = \frac{1}{N_q - 1} \sum_{a=1, a \neq m}^{N_q} Dist(P^a, P^m) \tag{40}$$

The event distribution with the minimum average distance is identified as the baseline distribution $P_q^b$ for the event distributions in the cluster $C_q$.

The K baseline distributions of the K clusters are given by:

$$\{P_1^b, P_2^b, \ldots, P_k^b\} \tag{41}$$

where
the superscript "b" denotes the baseline distribution; and
the subscript is the cluster index.

In other implementations, K++ means clustering, or Gaussian-based clustering, can be used to optimize the number of K centroids of K clusters of event distributions in the k-dimensional space. For example, K-means cluster may begin with K=1 cluster centers and K++ means clustering or Gaussian-based clustering are applied to K-means clustering to optimize the number of clusters.

Figure 16:
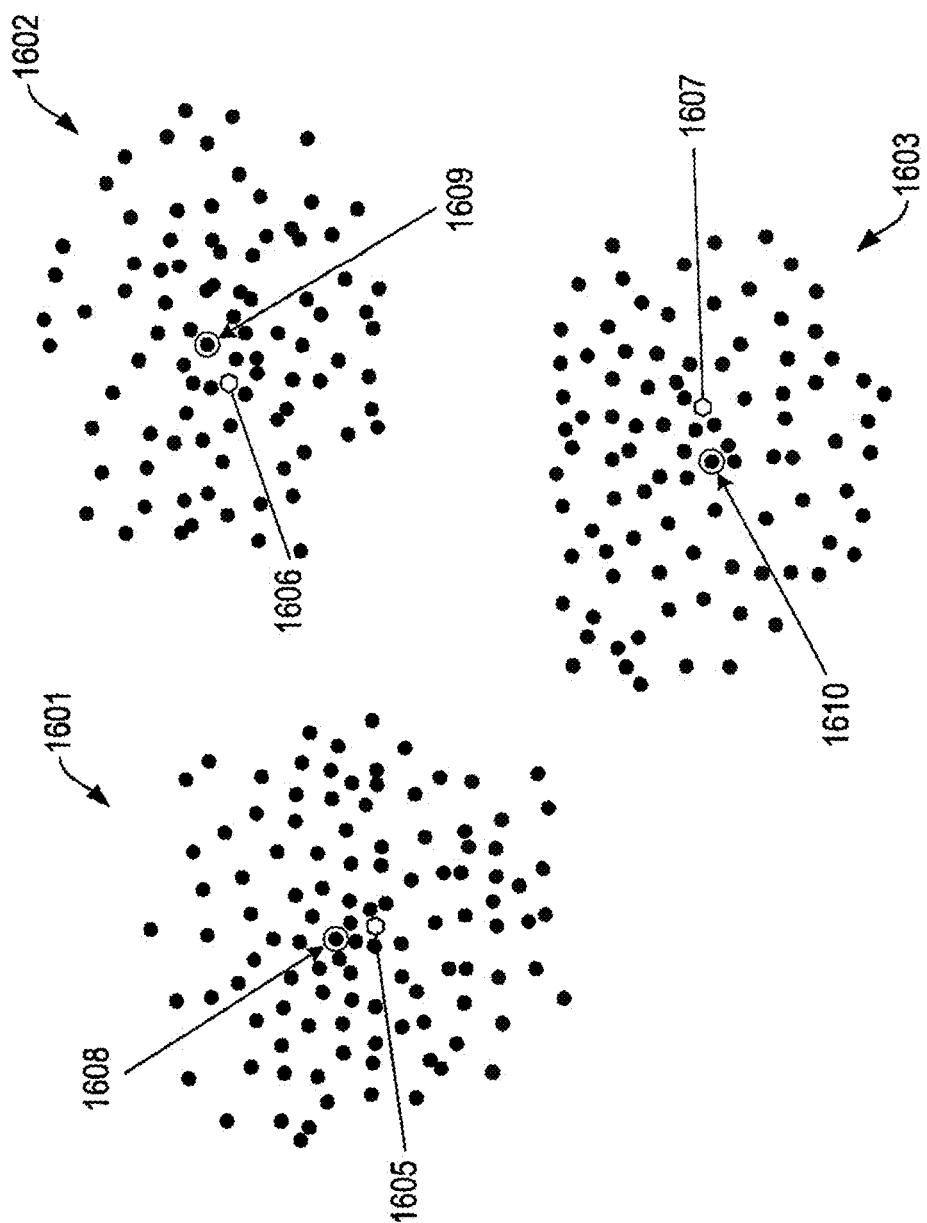
FIG. 16 shows an example of three event distribution clusters for an object that operates in three different normal state modes.

FIG. 16 shows an example of three event distribution clusters 1601-1603 (i.e., K=3) in a k-dimensional space for an object that operates in three different normal state modes. Unshaded hexagonal-shaped dots 1605-1607 represent centroids of the clusters 1601-1603 obtained from K-means clustering as describe above. Circled data points 1608-1610 are baseline distributions for the clusters 1601-1603. In one implementation, the baseline distributions are computed for clusters 1601-1603 using LOF analysis as described above with reference to Equations (20a)-(24). In another implementation, the baseline distributions are computed for clusters as described above with reference to Equation (34).

In one implementation, the operations management server 132 also computes an expected deviation, or expected drift, for each of the clusters as described above with reference to Equations (28)-(29b). In another implementation, the operations management server 132 computes a discrepancy radius for each of the clusters in accordance with the descriptions in Equations (33a)-(33d) and Equation (34).

Root Cause of Abnormal Operational State of the Object

When abnormal behavior as has been detected, the operations management server 132 computes a mismatch distribution between events of the baseline distribution and corresponding events of the runtime distribution. The mismatch distribution is computed as a component wise absolute difference between probabilities of the baseline distribution $P^b$ in Equation (19) and corresponding probabilities of the runtime distribution $P^r$ in Equation (27). The mismatch distribution between corresponding probabilities of the baseline distribution and the runtime distribution is given by:

$$(|p_1^r - p_1^b|, \ldots, |p_j^r - p_j^b|, \ldots, |p_k^r - p_k^b|) \quad (42)$$

The absolute differences are rank ordered from largest to smallest. The one or more events associated with the largest absolute differences are the events that contribute the most to the difference between the baseline distribution and the runtime distribution.

Figure 17:
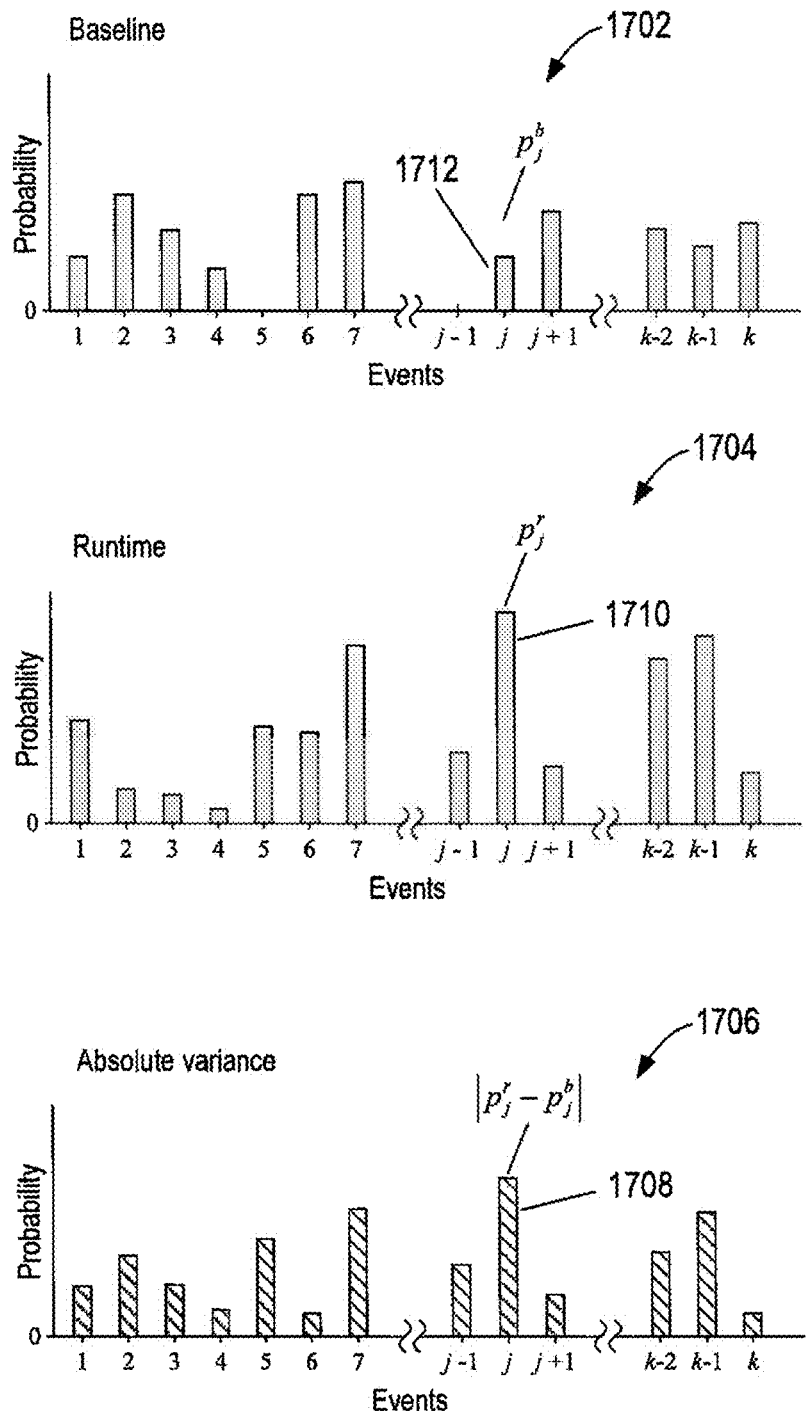
FIG. 17 shows example plots of a baseline distribution, a runtime distribution, and a mismatch distribution.

FIG. 17 shows a plot 1702 of an example baseline distribution for a set of k events, a plot 1704 of an example runtime distribution for the same set of k events, and a plot 1706 of a mismatch distribution. The mismatch distribution is obtained from computing absolute differences between corresponding probabilities in the baseline and runtime distributions according to Equation (42). For example, bar 1708 is an absolute difference between the runtime probability 1710 and the baseline probability 1712

When an alert indicating an object has entered an abnormal operational state is triggered as described above, the operations management server 132 evaluates one or more combinations of the highest ranked events with corresponding largest absolute variances in Equation (42) to identify a root cause of the problem that created the abnormal operational state of the object and triggered the alert.

FIG. 18 shows a table of example rules stored in a data storage device and accessed by the operations management server 132 to identify the performance problem with an object and generate a recommendation for correcting the performance problem. Column 1802 list the events and combinations of events. Column 1804 list the performance problems associated with the events listed in column 1802. Column 1806 list the recommendations for correcting the performance problems listed in column 1804. When any of the events or combinations events is identified from the largest absolute differences in FIG. 17 the corresponding performance problem is displayed in the GUI and a corresponding recommendation for correcting the problem is also displayed the GUI. For example, when the combination of events 1808 have the largest corresponding absolute differences, the performance problem identified as "insufficient vCPU allocated" 1810 to the object VM is displayed in the GUI along with the recommendation "increase vCPU allocation to VM" 1812.

The operations management server 132 executes a feedback mechanism that rates how indicative usage of the one or more baseline distributions obtained as described above are for detecting abnormal behavior of an object. In one implementation, the operations management server 132 may provide a GUI that enables users, such as systems administrators and application owners, to input ratings for the baseline distribution. For example, a user may input a like or dislike (i.e., binary scale) or rate how useful of the baseline distributions is on a scale from one to five. The operations management server 132 averages the ratings over time to determine an average score. In another implementation, the operations management server 132 may learn the significance of the baseline distribution from whether a service level objective has been satisfied or the KPI for the object has changed to indicate some degree of improvement in the object as a result of applying remedial measures to correct the problem identified by the one or more events with the largest corresponding absolute differences.

The operations management server 132 can measure the abnormality degree or criticality of alerts using the baseline distribution. When an alert has been triggered, an abnormality degree is computed as follows:

$$\text{Abnormal\_degree} = \text{Dist}(P^r, P^c) - \text{MaxDist} \quad (43)$$

where $$p^c = (p_1^c, \ldots, p_j^c, \ldots, p_k^c)$$

is the centroid of the N event distributions with each component given by $$p_j^c = \frac{1}{N} \sum_{n=1}^{N} p_j^n$$

When the runtime distribution $P^r$ satisfies the follow condition:

$$\text{Dist}(P^r, P^b) - \text{Abnormal\_degree} > 0 \quad (44)$$

the runtime distribution exceeds the abnormality degree and the difference in Equation (44) can be used to score the abnormality and trigger an additional alert indicating the degree to which the object is in an abnormal operations state. Examples of abnormalities and associated criticalities that may be displayed in a GUI with an alert are given in the following table:

| Difference | Alert degree |
| --- | --- |
| $0.25 \geq \text{Dist}(P^r, P^b) - \text{Abnormal\_degree} > 0$ | Warning |
| $0.5 \geq \text{Dist}(P^r, P^b) - \text{Abnormal\_degree} > 0.25$ | Error |
| $0.75 \geq \text{Dist}(P^r, P^b) - \text{Abnormal\_degree} > 0.5$ | Needs attention |
| $\text{Dist}(P^r, P^b) - \text{Abnormal\_degree} > 0.75$ | Critical |

The methods described below with reference to FIGS. 19-23 are stored in one or more data-storage devices as machine-readable instructions that when executed by one or more processors of a computer system, such as the computer system shown in FIG. 24, identify runtime problems with an object of a datacenter. The computer-implemented method described below eliminates human errors in detecting performance problems of an object in a data center and significantly reduces the time for detecting problems and identifying the root cause from days and weeks to minutes and seconds, thereby providing immediate notification of a problem, providing a recommendation for correcting the problem, and enabling rapid execution of remedial measures that correct the problem.

Figure 19:
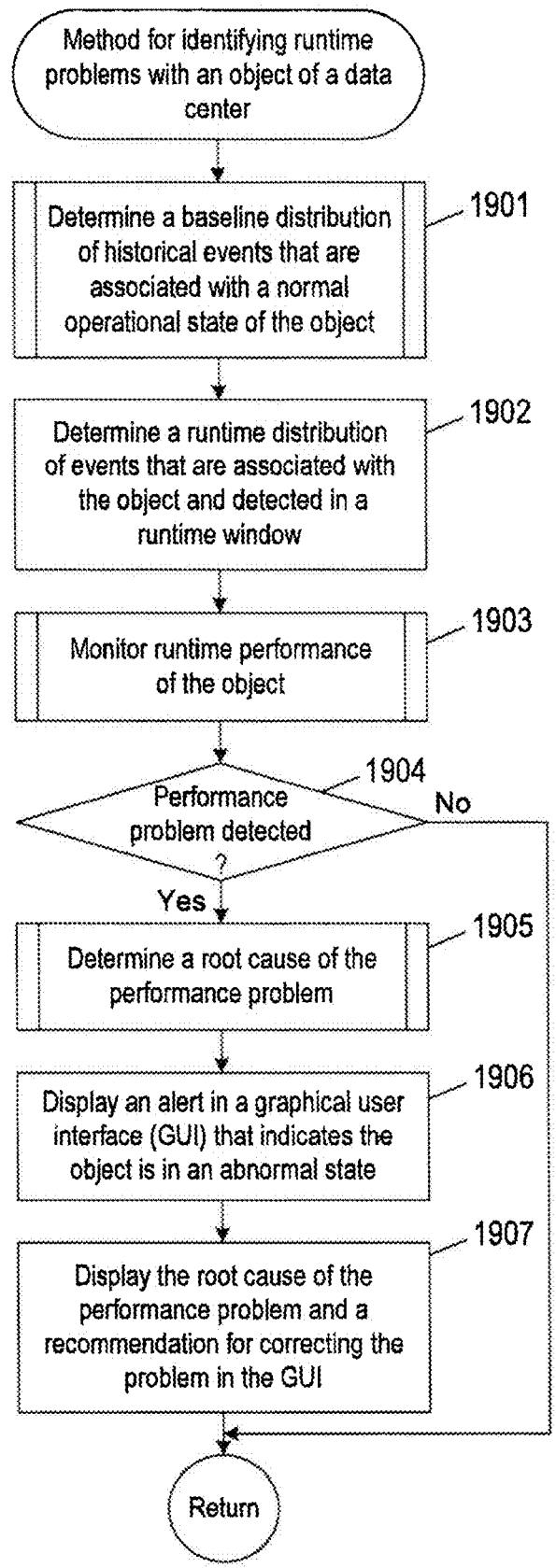
FIG. 19 is a flow diagram illustrating an example implementation of a method for identifying runtime problems with an object of a data center.

FIG. 19 is a flow diagram illustrating an example implementation of a method for identifying runtime problems with an object of a data center. In block 1901, a "determine a baseline distribution of historical events that are associated with a normal operational state of the object" procedure is performed. Example implementations of the "determine a baseline distribution of historical events that are associated with a normal operational state of the object" procedure is described below with reference to FIGS. 20 and 21. In block 1902, a runtime distribution of events that are associated with the object and detected in a runtime window as determined as described above with reference to Equations (26) and (27). In block 1903, a "monitor runtime performance of the object" procedure is performed. An example implementation of the "monitor runtime performance of the object" procedure is described below with reference to FIG. 22. In decision block 1904, when a runtime performance problem is detected control flows block 1905. Detection of a runtime performance problem in block 1904 depends on how the object is monitored, such as described below with reference to FIG. 22. In another implementation, a KPI (e.g., latency or throughput) of the object may be used to monitor the object. When one or more consecutive KPI values violate a corresponding threshold, a performance problem has been detected and control flows to block 1905. In still another implementation, an expected deviation may be computed and the object monitored as described above with reference to Equations (28)-(29b). In block 1905, a "determine a root cause of the performance problem" procedure is performed. An example implementation of the "determine a root cause of the performance problem" procedure is described below with reference to FIG. 23. In block 1906, an alert is displayed in a GUI of a display or monitor that indicates the object is in an abnormal operational state. In block 1907, the root cause of the performance problem identified in block 1905 is displayed in the GUI. A recommendation for correcting the performance problem may also be displayed in the GUI.

Figure 20:
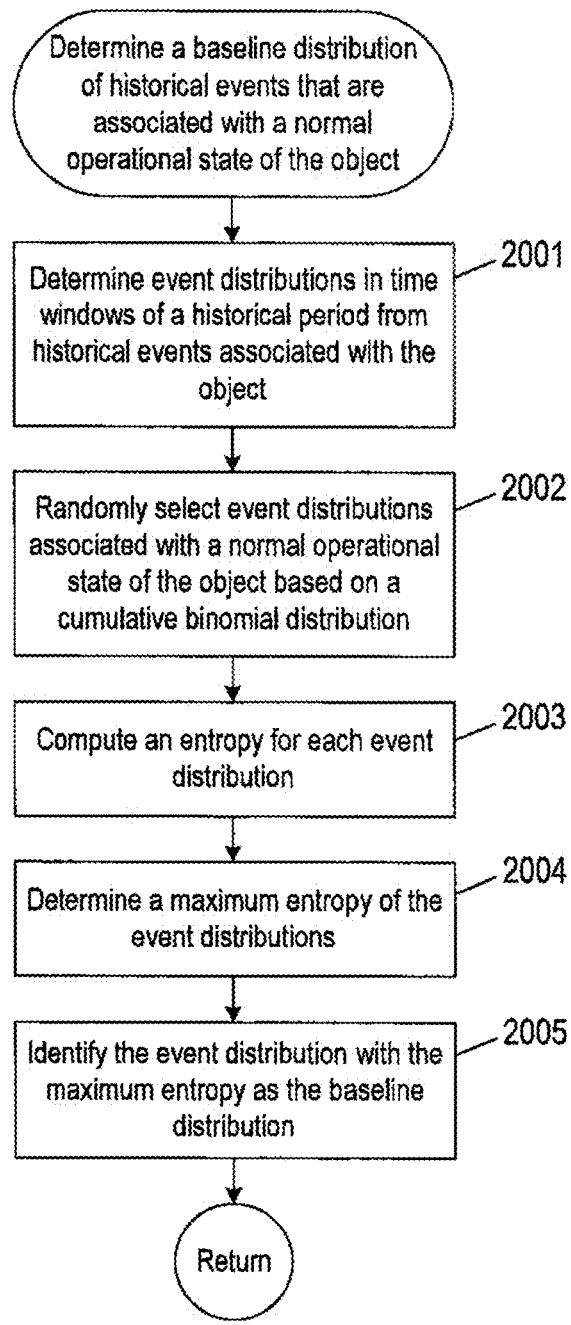
FIG. 20 is a flow diagram illustrating an example implementation of the "determine a baseline distribution of historical events that are associated with a normal operational state of the object" procedure performed in FIG. 19.

FIG. 20 is a flow diagram illustrating an example implementation of the "determine a baseline distribution of historical events that are associated with a normal operational state of the object" procedure performed in block 1901 of FIG. 19. In block 2001, event distributions in time windows of a historical time period are determined from historical events associated with the object as described above with reference to FIG. 13. In block 2002, event distributions associated with normal operational states of the object are randomly selected to identify dominant distributions based on a cumulative binomial distribution as described above with reference to Equations (15a)-(15b) and FIG. 14 and Equation (17). In block 2003, an entropy is computed for each of the dominant distributions as described above with reference to Equation (17). In block 2004, a maximum entropy of the entropies computed in block 2003 is determined as described above with reference to Equation (18). In block 2005, the event distribution with the maximum entropy is identified as the baseline distribution as describe above with reference to Equation (19).

Figure 21:
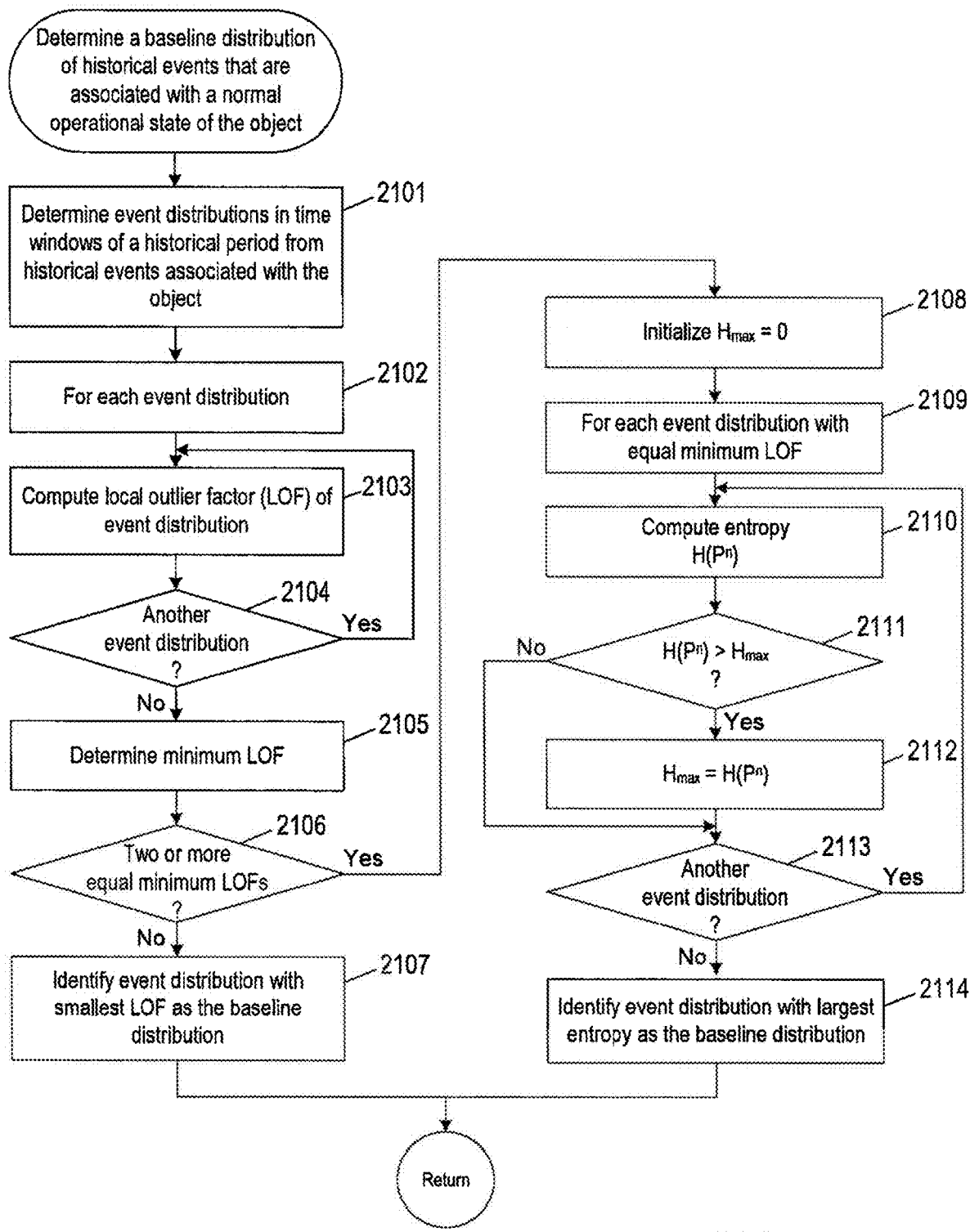
FIG. 21 shows a flow diagram of the routine "determine a baseline distribution of historical events that are associated with a normal operational state of the object" procedure performed in FIG. 19.

FIG. 21 shows a flow diagram of the routine "determine a baseline distribution of historical events that are associated with a normal operational state of the object" procedure performed in block 1901 of FIG. 19. In block 2101, event distributions in time windows of a historical time period are determined from historical events associated with the object as described above with reference to FIG. 13. A loop beginning with block 2102 repeats the operation represented by block 2103 for each event distribution obtained in block 2101. In block 2103, an LOF is computed for each event-type distribution as described above with reference to Equations (20a)-(24). In decision block 2104, when an LOF has been computed for each event-type distribution, control flows to block 2104. In block 2104, a minimum LOF determined from the LOFs computed in block 2103. In decision block 2106, when two or more minimum LOFs are equal, control flows to block 2108. Otherwise, control flows to block 2107. In block 2107, the event-type distribution with the minimum LOF is identified as the baseline distribution. In block 2108, a maximum entropy $H_{max}$ is initialized to zero. A loop beginning with block 2109 repeats the computational operations of blocks 2110-2113 for each event distribution. In block 2110, an entropy is computed for each event distribution as described above with reference to Equations (25a) and (25b). In decision block 2111, when the entropy computed in block 2110 is greater than the maximum entropy $H_{max}$, control flows to block 2112. Otherwise control flows to block 2113. In block 2112, the maximum entropy is reassigned the entropy computed in block 2110. In decision block 2113, when all event distributions have been considered control flows to block 2114. In block 2114, the event-type distribution with minimum LOF and maximum entropy is identified as the baseline distribution.

Figure 22:
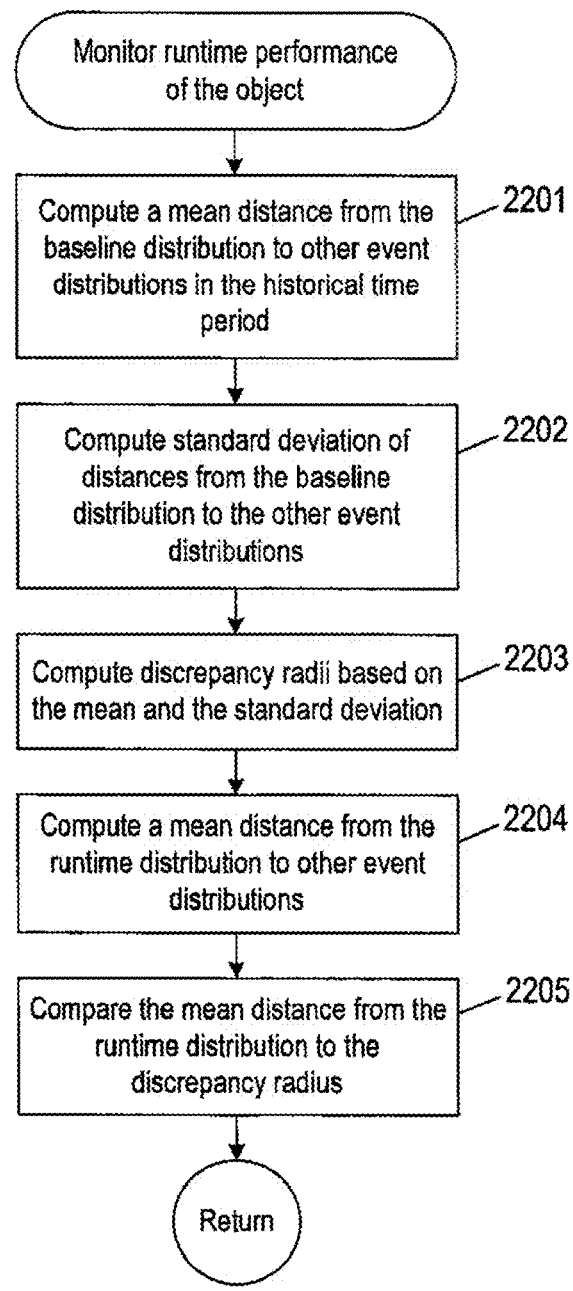
FIG. 22 shows a flow diagram of the routine "monitor runtime performance of the object" procedure performed in FIG. 19.

FIG. 22 shows a flow diagram of the routine "monitor runtime performance of the object" procedure performed in block 1903 of FIG. 19. In block 2201, a mean distance from the baseline distribution to the other event distributions is computed as described above with reference to Equation (30a). In block 2202, a standard deviation of the distance computed in block 2201 is computed as described above with reference to Equation (30b). In block 2203, discrepancy radii are computed based on the mean and the standard deviation as described above with reference to Equation (31) or Equation (34). In block 2204, a mean distance between the runtime distribution and the event distributions is computed as described above with reference to Equation (32). In block 2205, the mean distance between the runtime distribution and the event distributions is compared to the discrepancy radii obtained in block 2203 as described above with reference to Equations (33a)-(33d).

Figure 23:
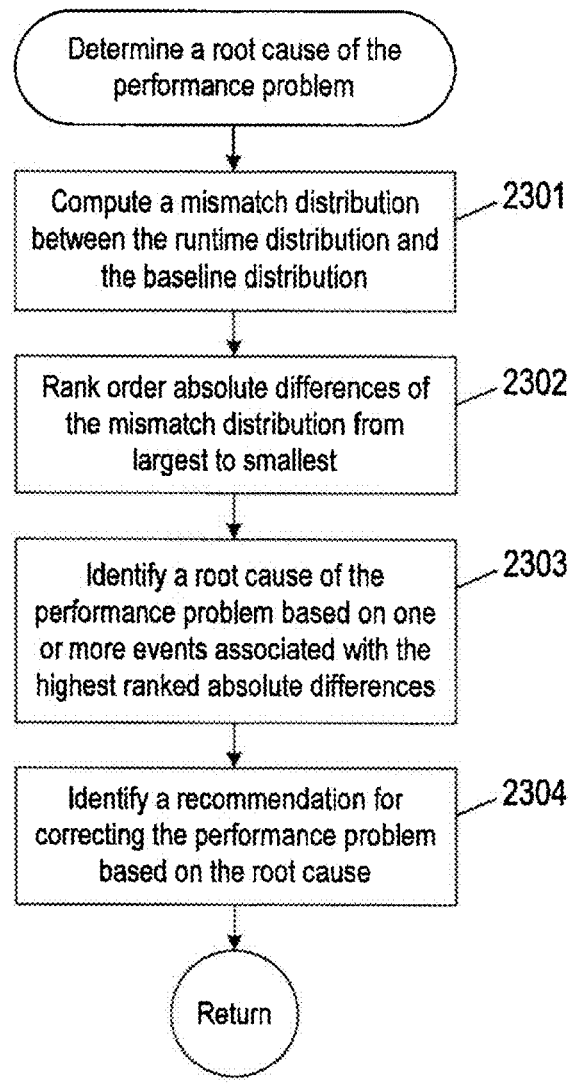
FIG. 23 is a flow diagram "determine a root cause of the performance problem" procedure performed in FIG. 19.

FIG. 23 is a flow diagram "determine a root cause of the performance problem" procedure performed in block 1905 of FIG. 19. In block 2301, a mismatch distribution is computed based on the runtime distribution and the baseline distribution as described above with reference to Equation (42). In block 2302, absolute differences of the mismatch distribution are rank order from largest to smallest. In block 2303, a root cause of the performance problem is identified based on one or more events associated with the highest ranked absolute differences obtained in block 2302 as described above with reference to FIG. 18. In block 2304, a recommendation for correcting the performance problem is determined based on the root cause as described above with reference to FIG. 18.

Figure 24:
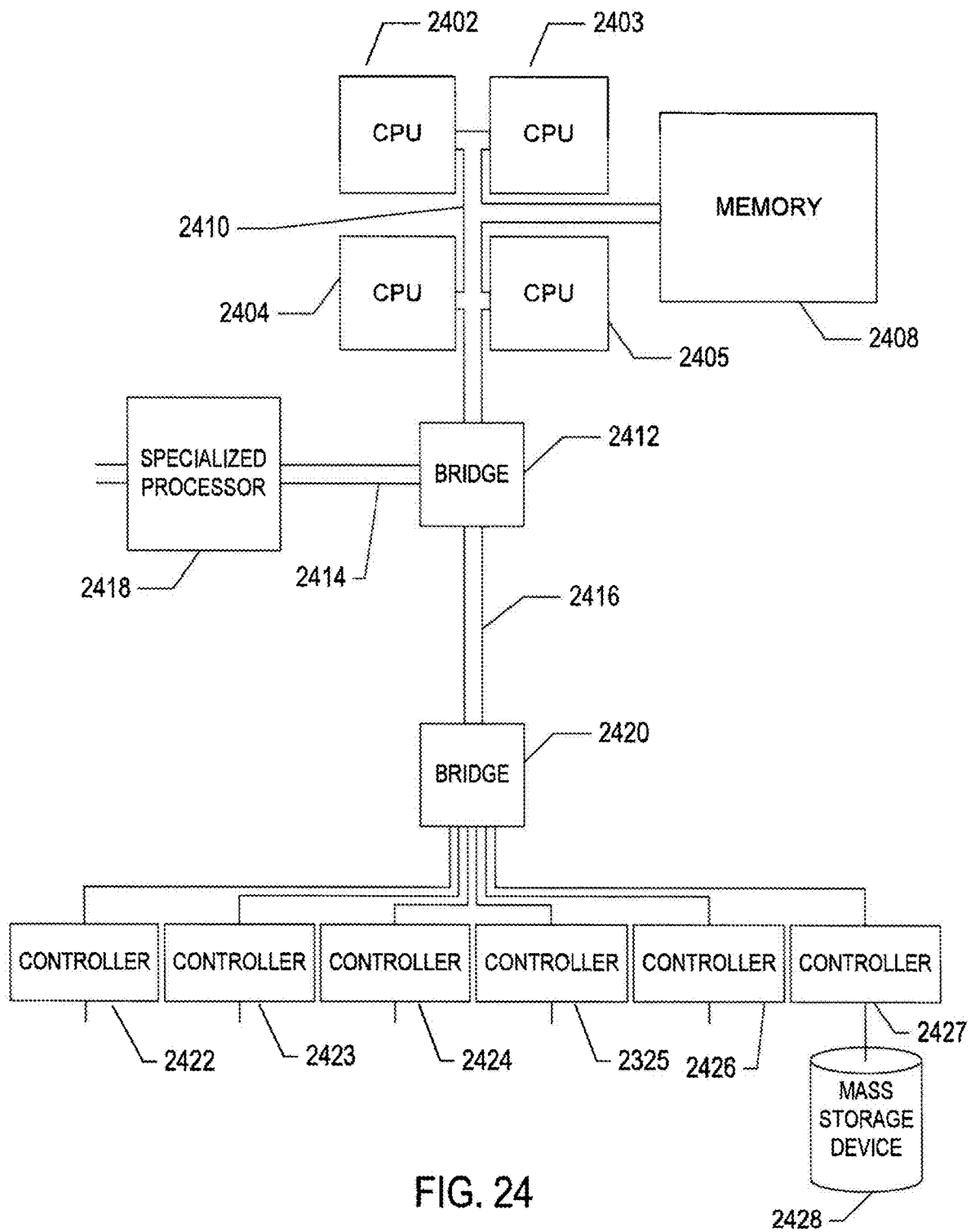
FIG. 24 shows an example architecture of a computer system that may be used to host the operations management server 132 and perform the operations identifying runtime problems with an object of a data center.

FIG. 24 shows an example architecture of an administration computer system that may be used to host the operations management server 132 and perform the operations identifying runtime problems with an object of a data center. The computer system contains one or multiple central processing units ("CPUs") 2402-2405, one or more electronic memories 2408 interconnected with the CPUs by a CPU/memory-subsystem bus 2410 or multiple busses, a first bridge 2412 that interconnects the CPU/memory-subsystem bus 2410 with additional busses 2414 and 2416, or other types of high-speed interconnection media, including multiple, high-speed serial interconnects. The busses or serial interconnections, in turn, connect the CPUs and memory with specialized processors, such as a graphics processor 2418, and with one or more additional bridges 2420, which are interconnected with high-speed serial links or with multiple controllers 2422-2427, such as controller 2427, that provide access to various different types of computer-readable media, such as computer-readable medium 2428, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 2428 is a data-storage device, which may include, for example, electronic memory, optical or magnetic disk drive, a magnetic tape drive, USB drive, flash memory and any other such data-storage device or devices. The computer-readable medium 2428 is used to store machine-readable instructions that encode the computational methods described above.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A computer-implemented operations management server that identifies and corrects runtime problems with an object of a data center, the operations management server performs operations comprising:
    determining a baseline distribution from historical events recorded in separate time windows of a historical time period, the baseline distribution representing a normal operational state of the object;
    determining a runtime distribution of runtime events that are associated with the object and detected in a runtime window;
    monitoring runtime performance of the object while the object is running in the datacenter to identify when the object is in an abnormal operational state;
    in response to detecting the object in an abnormal operational state, determining a root cause of a performance problem with the object based on largest absolute differences between one or more corresponding probabilities of events of the baseline distribution and the runtime distribution; and
    executing remedial measures that correct the root cause of the performance problem, the remedial measures including increasing allocation of a resource to the object or migrating the object from a server computer on which the performance problem occurs to another server computer in the data center.

2. The operations management server of claim 1 wherein determining the baseline distribution that represents the normal operational state of the object comprises:
    determining event distributions in the time windows of a the historical time period from the historical events associated with the object;
    randomly selecting event distributions associated with the normal operational state of the object based on a cumulative binomial distribution for the object being in a normal state;
    computing an entropy for each event distribution;
    determining a maximum entropy of the entropies computed for each event distribution; and
    identifying the event distribution with the maximum entropy as the baseline distribution.

3. The operations management server of claim 1 wherein determining the baseline distribution that represents the normal operational state of the object comprises:
    determining event distributions in the time windows of the historical time period from the historical events associated with the object;
    computing a local outlier factor for each event distribution;
    determining a minimum local outlier factor; and
    identifying the baseline distribution as the event distribution with the minimum local outlier factor.

4. The operations management server of claim 1 wherein determining the runtime distribution of the runtime events that are associated with the object and detected in the runtime window comprises:
    computing a probability for each event that is associated with the object and occurs in the runtime window;
    assigning a zero probability to events associated with the object but did not occur in the runtime window; and
    forming the runtime distribution from the probability of each event associated with the object.

5. The operations management server of claim 1 wherein monitoring runtime performance of the object comprises:
    computing a distance between the baseline distribution and each of the event distributions;
    computing a mean distance of distances between the baseline distribution and the event distributions;
    computing a standard deviation of the distances between the baseline distribution and the event distributions;
    computing discrepancy radii centered at the mean distance of distances between the baseline distribution and the event distributions;
    comparing the mean distance between the runtime distribution and the event distributions to the discrepancy radii; and
    identifying the object as being in an abnormal operation state when the mean distance is outside the discrepancy radii.

6. The operations management server of claim 1 wherein monitoring runtime performance of the object comprises:
    comparing runtime key performance indicator values to a corresponding KPI threshold; and
    identifying the object as being in an abnormal operation state when the KPI violates the KPI threshold.

7. The operations management server of claim 1 wherein monitoring runtime performance of the object comprises:
    for each event distribution, computing a distance between the baseline distribution and the event distribution;

identifying a maximum distance between the baseline distribution and the event distributions as an expected deviation;

computing a distance between the runtime distribution and the baseline distribution; and identifying the object as being in an abnormal operation state when the distance between the runtime distribution and the baseline distribution is greater than the expected deviation.

8. The operations management server of claim 1 wherein determining the root cause of the performance problem comprises:

determining a mismatch distribution of absolute differences between probabilities of events of the baseline distribution and corresponding probabilities of events of the runtime distribution;

rank ordering the absolute differences from largest to smallest;

identifying the root cause of the problem with the object based on one or more of the events with highest ranked absolute differences; and identifying a recommendation for correcting the performance problem based on the root cause.

9. A computer system for identifying and correcting runtime problems with objects of a data center, the computer system comprising:

one or more processors;

one or more data-storage devices; and machine-readable instructions stored in the one or more data-storage devices that when executed using the one or more processors control the system to performance operations comprising:

determining a baseline distribution from historical events recorded in separate time windows of a historical time period, the baseline distribution representing a normal operational state of the object;

determining a runtime distribution of runtime events that are associated with the object and detected in a runtime window;

monitoring runtime performance of the object while the object is running in the datacenter to identify when the object is in an abnormal operational state;

in response to detecting the object in an abnormal operational state, determining a root cause of a performance problem with the object based on largest absolute differences between one or more corresponding probabilities of events of the baseline distribution and the runtime distribution; and executing remedial measures that correct the root cause of the performance problem, the remedial measures including increasing allocation of a resource to the object or migrating the object from a server computer on which the performance problem occurs to another server computer in the data center.

10. The system of claim 9 wherein determining the baseline distribution that represents the normal operational state of the object comprises:

determining event distributions in the time windows of the historical time period from the historical events associated with the object;

randomly selecting event distributions associated with the normal operational state of the object based on a cumulative binomial distribution for the object being in a normal state;

computing an entropy for each event distribution;

determining a maximum entropy of the entropies computed for each event distribution; and identifying the event distribution with the maximum entropy as the baseline distribution.

11. The system of claim 9 wherein determining the baseline distribution that represents the normal operational state of the object comprises:

determining event distributions in the time windows of the historical time period from the historical events associated with the object;

computing a local outlier factor for each event distribution;

determining a minimum local outlier factor; and identifying the baseline distribution as the event distribution with the minimum local outlier factor.

12. The system of claim 9 wherein determining the runtime distribution of the runtime events that are associated with the object and detected in the runtime window comprises:

computing a probability for each event that is associated with the object and occurs in the runtime window;

assigning a zero probability to events associated with the object but did not occur in the runtime window; and forming the runtime distribution from the probability of each event associated with the object.

13. The system of claim 9 wherein monitoring runtime performance of the object comprises:

computing a distance between the baseline distribution and each of the event distributions;

computing a mean distance of distances between the baseline distribution and the event distributions;

computing a standard deviation of the distances between the baseline distribution and the event distributions;

computing discrepancy radii centered at the mean distance of distances between the baseline distribution and the event distributions;

comparing the mean distance between the runtime distribution and the event distributions to the discrepancy radii; and identifying the object as being in an abnormal operation state when the mean distance is outside the discrepancy radii.

14. The system of claim 9 wherein monitoring runtime performance of the object comprises:

comparing runtime key performance indicator values to a corresponding KPI threshold; and identifying the object as being in an abnormal operation state when the KPI violates the KPI threshold.

15. The system of claim 9 wherein monitoring runtime performance of the object comprises:

for each event distribution, computing a distance between the baseline distribution and the event distribution;

identifying a maximum distance between the baseline distribution and the event distributions as an expected deviation;

computing a distance between the runtime distribution and the baseline distribution; and identifying the object as being in an abnormal operation state when the distance between the runtime distribution and the baseline distribution is greater than the expected deviation.

16. The system of claim 9 wherein determining the root cause of the performance problem comprises:

determining a mismatch distribution of absolute differences between probabilities of events of the baseline distribution and corresponding probabilities of events of the runtime distribution;

rank ordering the absolute differences from largest to smallest;

identifying the root cause of the problem with the object based on one or more of the events with highest ranked absolute differences; and
identifying a recommendation for correcting the performance problem based on the root cause.

17. A non-transitory computer-readable medium having instructions encoded thereon for enabling one or more processors of a computer system to perform operations comprising:
determining a baseline distribution from historical events recorded in separate time windows of a historical time period, the baseline distribution representing a normal operational state of the object;
determining a runtime distribution of runtime events that are associated with the object and detected in a runtime window;
monitoring runtime performance of the object while the object is running in the datacenter to identify when the object is in an abnormal operational state;
in response to detecting the object in an abnormal operational state, determining a root cause of a performance problem with the object based on largest absolute differences between one or more corresponding probabilities of events of the baseline distribution and the runtime distribution; and
executing remedial measures that correct the root cause of the performance problem, the remedial measures including increasing allocation of a resource to the object or migrating the object from a server computer on which the performance problem occurs to another server computer in the data center.

18. The medium of claim 17 wherein determining the baseline distribution that represents the normal operational state of the object comprises:
determining event distributions in the time windows of the historical time period from the historical events associated with the object;
randomly selecting event distributions associated with the normal operational state of the object based on a cumulative binomial distribution for the object being in a normal state;
computing an entropy for each event distribution;
determining a maximum entropy of the entropies computed for each event distribution; and
identifying the event distribution with the maximum entropy as the baseline distribution.

19. The medium of claim 17 wherein determining the baseline distribution that represents the normal operational state of the object comprises:
determining event distributions in the time windows of the historical time period from the historical events associated with the object;
computing a local outlier factor for each event distribution;
determining a minimum local outlier factor; and
identifying the baseline distribution as the event distribution with the minimum local outlier factor.

20. The medium of claim 17 wherein determining the runtime distribution of the runtime events that are associated with the object and detected in the runtime window comprises:
computing a probability for each event that is associated with the object and occurs in the runtime window;
assigning a zero probability to events associated with the object but did not occur in the runtime window; and
forming the runtime distribution from the probability of each event associated with the object.

21. The medium of claim 17 wherein monitoring runtime performance of the object comprises:
computing a distance between the baseline distribution and each of the event distributions;
computing a mean distance of distances between the baseline distribution and the event distributions;
computing a standard deviation of the distances between the baseline distribution and the event distributions;
computing discrepancy radii centered at the mean distance of distances between the baseline distribution and the event distributions;
comparing the mean distance between the runtime distribution and the event distributions to the discrepancy radii; and
identifying the object as being in an abnormal operation state when the mean distance is outside the discrepancy radii.

22. The medium of claim 17 wherein monitoring runtime performance of the object comprises:
comparing runtime key performance indicator values to a corresponding KPI threshold; and
identifying the object as being in an abnormal operation state when the KPI violates the KPI threshold.

23. The medium of claim 17 wherein monitoring runtime performance of the object comprises:
for each event distribution, computing a distance between the baseline distribution and the event distribution;
identifying a maximum distance between the baseline distribution and the event distributions as an expected deviation;
computing a distance between the runtime distribution and the baseline distribution; and
identifying the object as being in an abnormal operation state when the distance between the runtime distribution and the baseline distribution is greater than the expected deviation.

24. The medium of claim 17 wherein determining the root cause of the performance problem comprises:
determining a mismatch distribution of absolute differences between probabilities of events of the baseline distribution and corresponding probabilities of events of the runtime distribution;
rank ordering the absolute differences from largest to smallest;
identifying the root cause of the problem with the object based on one or more of the events with highest ranked absolute differences; and
identifying a recommendation for correcting the performance problem based on the root cause.

* * * * *